US006762288B2

(12) United States Patent
Ebenezer

(10) Patent No.: US 6,762,288 B2
(45) Date of Patent: Jul. 13, 2004

(54) REACTIVE AZO DYES

(75) Inventor: Warren James Ebenezer, Stockport (GB)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 10/276,493

(22) PCT Filed: May 16, 2001

(86) PCT No.: PCT/EP01/05552

§ 371 (c)(1),
(2), (4) Date: Nov. 15, 2002

(87) PCT Pub. No.: WO01/90256

PCT Pub. Date: Nov. 29, 2001

(65) Prior Publication Data

US 2004/0059099 A1 Mar. 25, 2004

(30) Foreign Application Priority Data

May 23, 2000 (GB) .............................................. 0012551

(51) Int. Cl.$^7$ ........................ C09B 62/533; D06P 1/384

(52) U.S. Cl. ........................ 534/637; 534/612; 534/631; 534/634; 534/635; 534/636; 534/642; 8/547; 8/549

(58) Field of Search ................................. 534/612, 631, 534/634, 635, 636, 637, 642; 8/547, 549

(56) References Cited

U.S. PATENT DOCUMENTS 2,963,472 A  12/1960  Seitz et al. .................. 260/146
5,969,113 A  10/1999  Deitz et al. .................. 534/634

FOREIGN PATENT DOCUMENTS

DE  1136037   9/1962
EP  0 764 694  9/1996

*Primary Examiner*—Fiona T. Powers
(74) *Attorney, Agent, or Firm*—Connolly Bove Lodge & Hutz LLP

(57) ABSTRACT

The present invention relates to reactive azo dyes of the formula (I) or an alkali metal salt thereof, wherein A is formula (i) or (ii) C is an optionally substituted aromatic or heteroaromatic residue; and $R^1$, $R^2$, B, D, Y, a, b, c, d and n are defined as given in claim 1, a process for preparing said dyes and a process for colouring fibre material, which comprises applying thereto said dyes.

28 Claims, No Drawings

REACTIVE AZO DYES

This invention relates to reactive azo dyes containing each of a triazine ring and at least one reactive vinyl sulphone group (or precursor thereof) and at least two azo groups. Such dyes are disclosed in, for example, EP-A-0623655, EP-A-0685532 and EP-A-076469 and typical dyes are as follows:

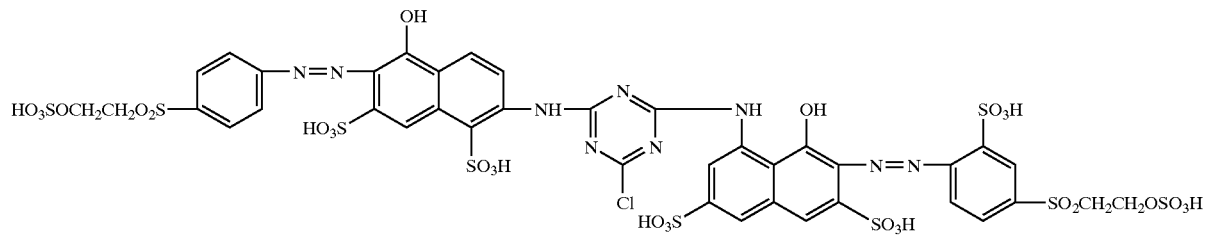

Example 46 of EP-A-0685532

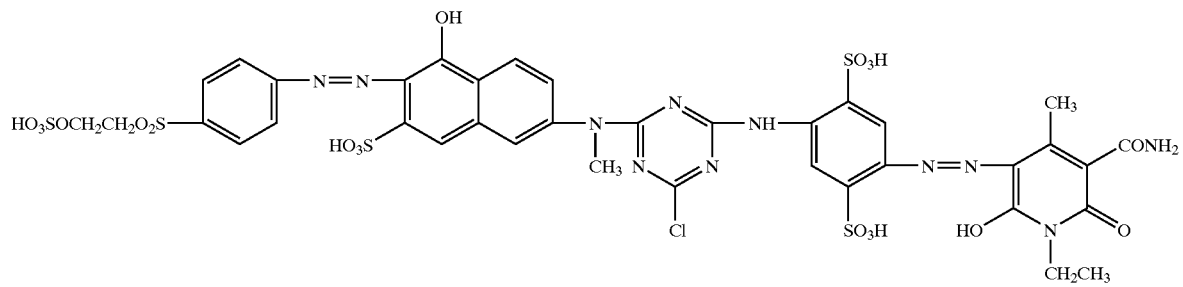

Example 81 of EP-A-0764694

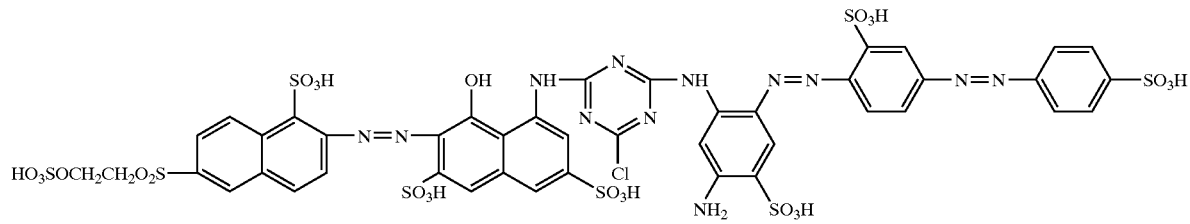

Example 38 of EP-A-0623655

However, none of the dyes disclosed in the abovementioned documents provide a particularly strong or bright yellow or reddish yellow shade with good migration properties, excellent build-up and good fastness properties.

Thus, the problem addressed by the invention is to provide such a dye capable of giving, particularly on cellulosic fabrics, a strong, bright yellow or reddish yellow shade with good migration properties, excellent build-up and which dyes are particularly easy and economical to produce.

We find surprisingly that it is possible to solve the abovementioned problems by the use of an azo dye containing, on the one hand, a monoazo dye component based on sulpho-J-acid as coupling component and a markedly electron deficient aromatic amine as diazo component and, on the other hand, an azo dye component containing each of a phenylene group and an aromatic group or hetero aromatic group, each dye component being linked, via an amino linkage to a triazine group, the second dye component being so linked via the phenylene group.

Thus, according to one aspect the invention provides an azo dye of the formula (I)

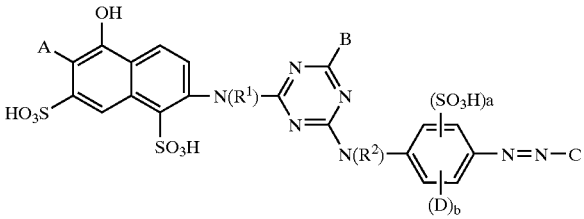

or an alkali metal salt thereof:

wherein: each of $R^1$ and $R^2$ independently is hydrogen, optionally substituted $C_{1-4}$ alkyl or optionally substituted phenyl;

A is

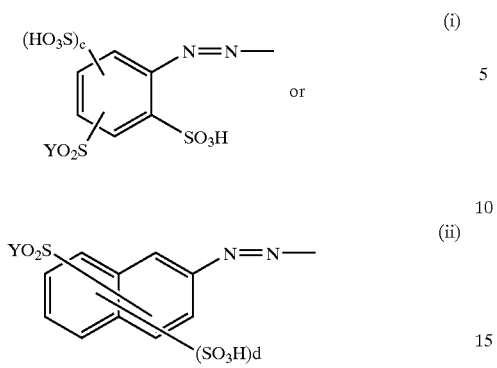

in which formula (i), c is zero or 1;
in which formula (ii), d is 1, 2 or 3 and a group SO$_3$H is ortho to the azo group; and
in which formula (i) or (ii), Y is the group —CH=CH$_2$; —CH$_2$CH$_2$U (wherein U is a leaving group); or —CH$_2$CH=CH$_2$;

B is fluorine; chlorine; the group OR$^3$ (in which R$^3$ is hydrogen, C$_{1-4}$ alkyl or phenyl); the group NR$^4$R$^5$ (in which each of R$^4$ and R$^5$ independently is hydrogen, C$_{1-4}$ alkyl or phenyl; or each of R$^4$, R$^5$ and N together form an optionally substituted aromatic heterocyclic ring); the group $^+$NR$^6$R$^7$R$^8$ (in which each of R$^6$, R$^7$ and R$^8$ independently is C$_{1-4}$ alkyl or phenyl or each of R$^6$, R$^7$ and R$^8$ and N together form an optionally substituted aromatic heterocylcic ring); or the group SR$^9$ (in which R$^9$ is hydrogen, C$_{1-4}$ alkyl or phenyl);

C is an optionally substituted aromatic or heteroaromatic residue;.

D is methyl, methoxy, amino, acylamino or ureido;
a is zero, 1 or 2;
b is zero, 1 or 2 and when b is 2 each D is independent of the other.

Preferably, the substituent D is methyl, methoxy, acylamino or ureido and the substituent B is preferably chlorine or a 3- or 4- carboxypyridinium salt derived respectively from nicotinic and isonicotinic acid.

In the above dye, the group A preferably has the formula

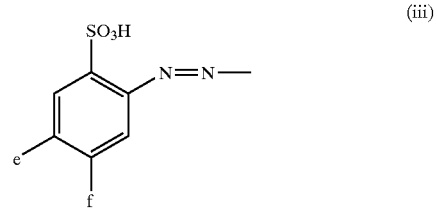

wherein e is —SO$_2$CH$_2$CH$_2$OSO$_3$H and f is absent; or
e is —SO$_3$H and f is —SO$_2$CH$_2$CH$_2$OSO$_3$H.
A preferred azo dye has the formula

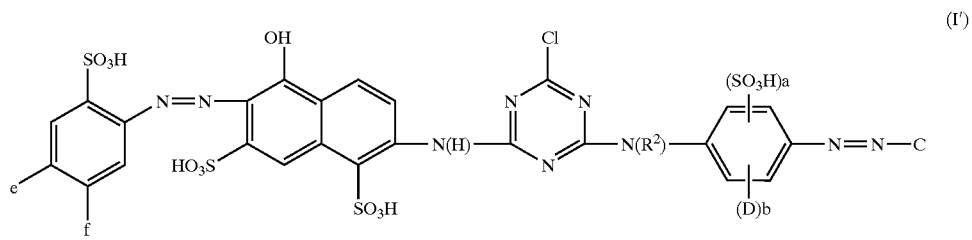

wherein each of R$^2$, C, D a, b, e and f is as defined above.

More preferably in the azo dye of the formula (I$^1$), at least one of the groups SO$_3$H or D is ortho to the azo group linking to the group C.

In one range of dyes of the formula (I$^1$) which is preferred, a is 1 or 2 and b is zero. More preferably, the group C is a heteroaromatic group, still more preferably a pyridonyl, pyrazolonyl, 2,6-diaminopyridinyl or 4-carboxy-2,6-dihydroxypyridinyl group, or is a hydroxynaphthalene group.

In another range of dyes of the formula (I) which is preferred a is zero or 1, b is 1 or 2 and D, or each D independently, is ureido, (C$_{1-4}$ alkyl)carbonylamino, C$_{1-4}$ alkoxy or C$_{1-4}$ alkylthio.

For such dyes within this other range, a preferred group C has the formula (iv)

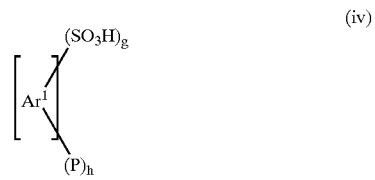

wherein : Ar$^1$ is an aromatic diazo component;
g is zero, 1, 2, 3 or 4;
h is zero, 1, 2 or 3; and
P, or each P independently, is C$_{1-4}$ alkyl, nitro, —SO$_2$NR$^8$ (in which R$^8$ is hydrogen, C$_{1-4}$ alkyl or phenyl), carboxyl, cyano, SO$_2$Y$^1$ (in which Y$^1$ is vinyl, allyl or CH$_2$CH$_2$V, where V is a leaving grup) or —NHAr$^2$ [in which Ar$^2$ is an aromatic residue substituted by at least one group T, the group T, or each group T independently, being selected from cyano, carboxyl, sulphonic acid and $SO_2Y^2$ (in which $Y^2$ is vinyl, allyl or $CH_2CH_2W$ (where W is a leaving group)].

More preferably, at least one group P is a group $SO_2Y^1$, where $Y^1$ is as defined above or a group $NHAr^2$ substituted by a group T, which group T is the group $SO_2Y^2$, in which $Y^2$ is as defined above.

Preferred values of $Y^1$ and $Y^2$ independently are —CH=CH$_2$; —CH$_2$—CH=CH$_2$; —CH$_2$CH$_2$Cl, —CH$_2$CH$_2$Br; —CH$_2$CH$_2$F; —CH$_2$CH$_2$OSO$_3$H; —CH$_2$CH$_2$SSO$_3$H; —CH$_2$CH$_2$OCOCH$_3$, —CH$_2$CH$_2$OPO$_3$H$_2$; —CH$_2$CH$_2$OCOC$_2$H$_5$; —CH$_2$CH$_2$OSO$_2$NR$^9$ (in which $R^9$ is hydrogen, $C_{1-4}$ alkyl or phenyl); and —CH$_2$CH$_2$OSO$_2$R$^{10}$ (in which $R^{10}$ is hydrogen, $C_{1-4}$ alkyl or phenyl).

Most preferably C is the group

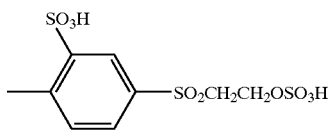

Typical azo dyes embodying the invention have the formula

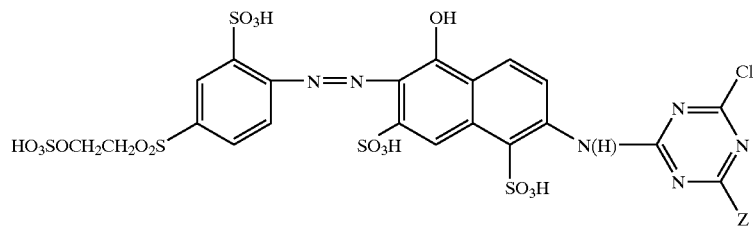

wherein Z is selected from

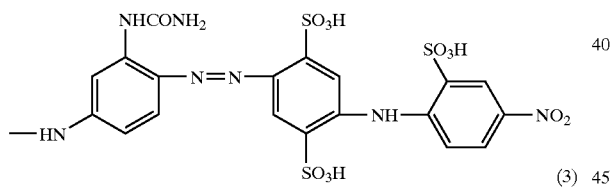
(1)

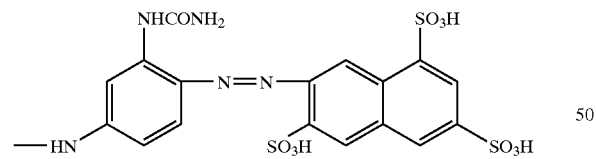
(3)

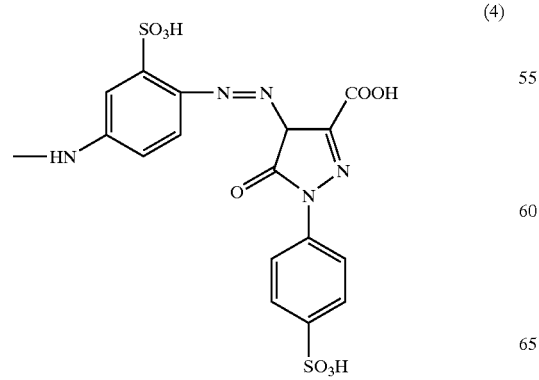
(4)

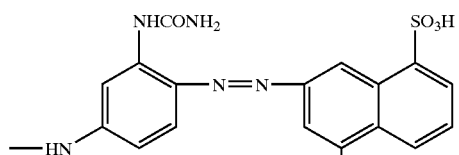
(5)

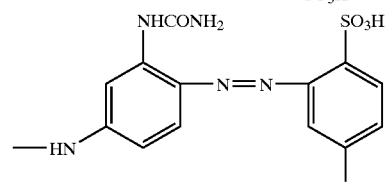
(6)

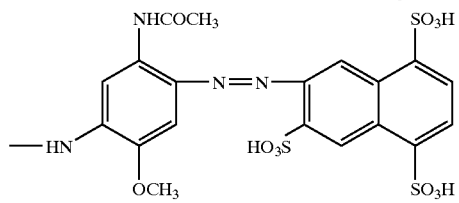
(7)

-continued

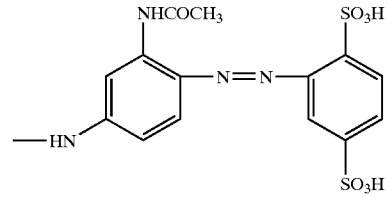
(8)

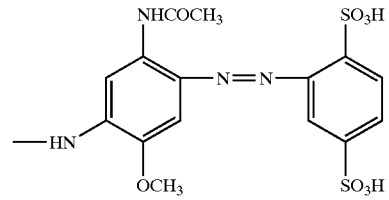
(9)

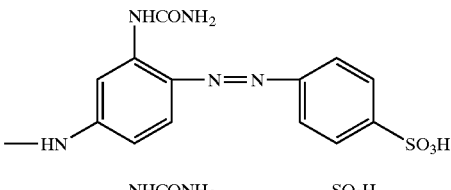
(10)

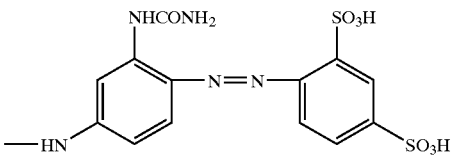
(11)

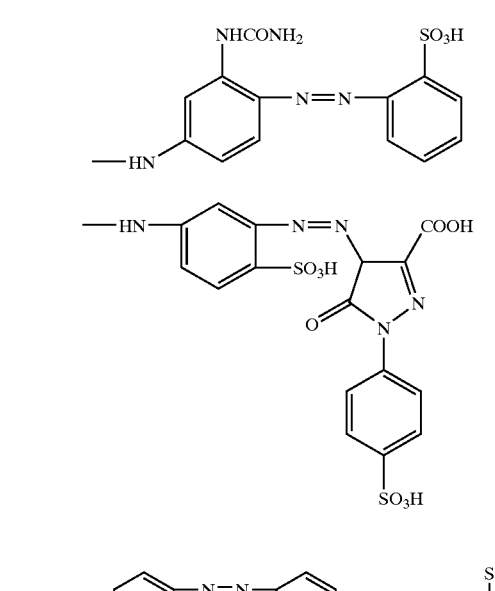
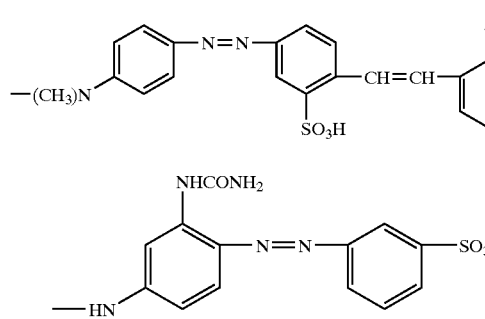
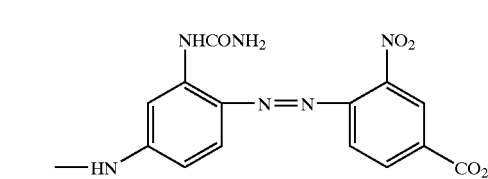
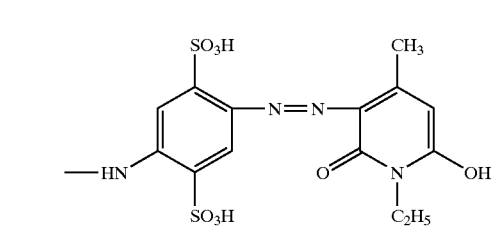
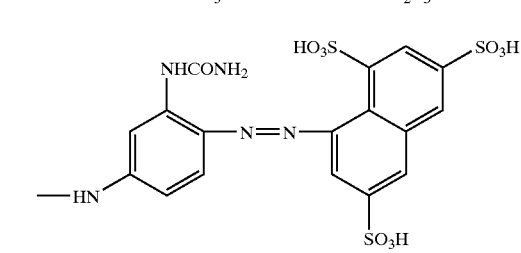
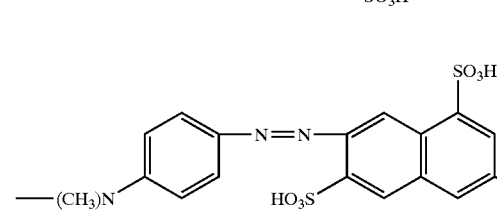
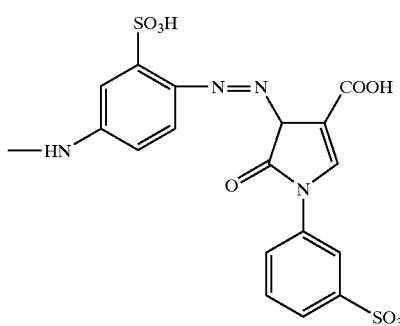
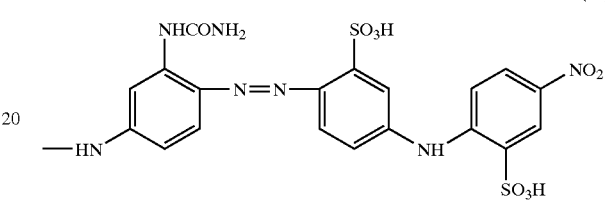
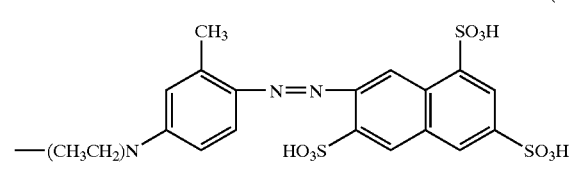
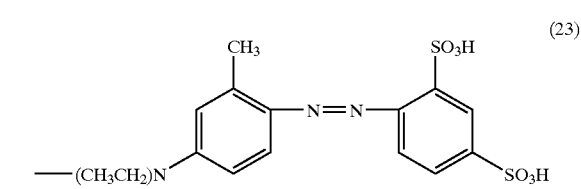
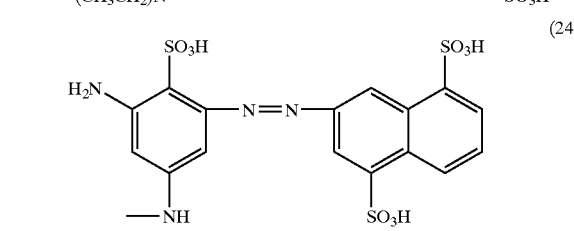
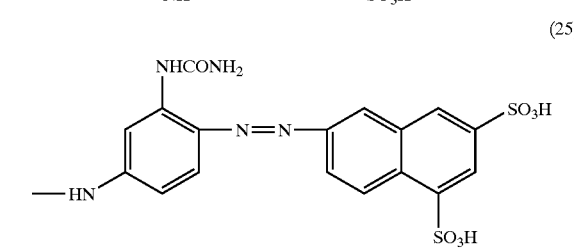
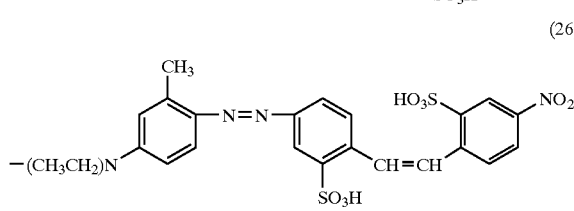

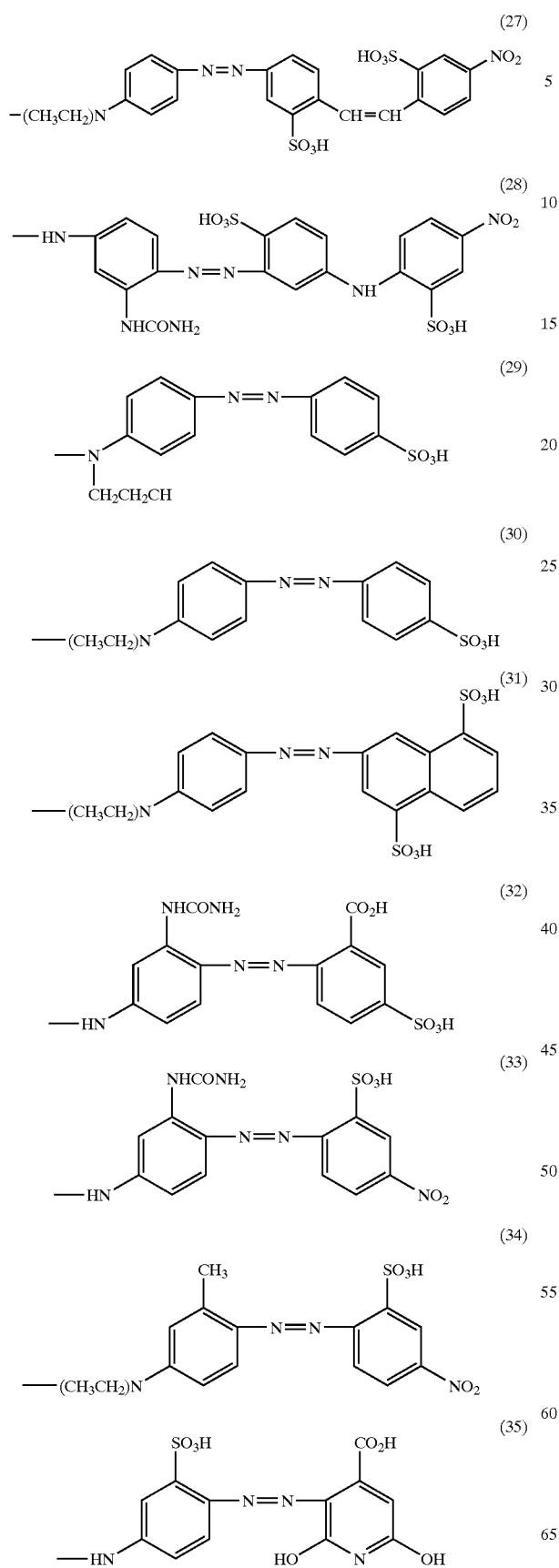
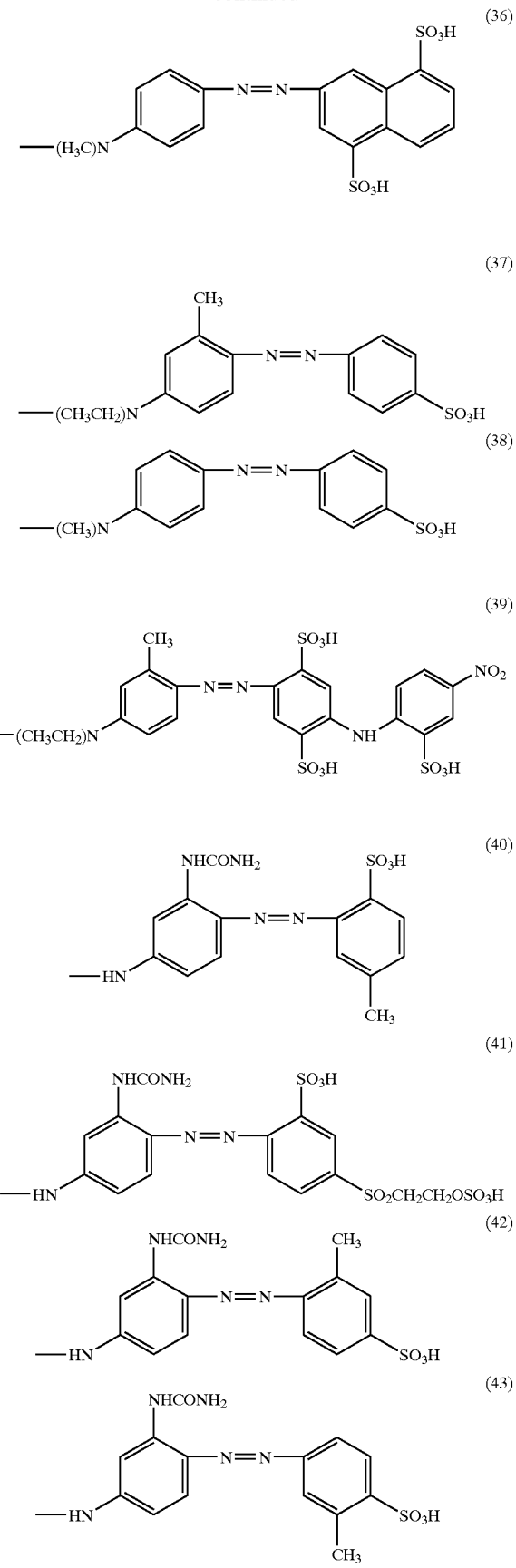

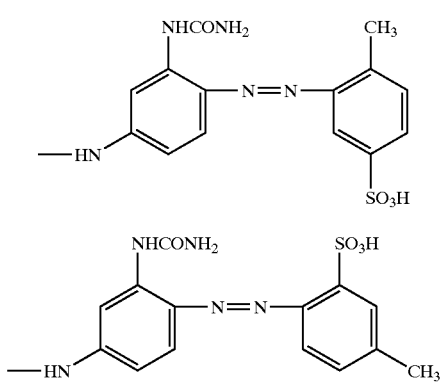

Another typical azo dye embodying the invention has the formula

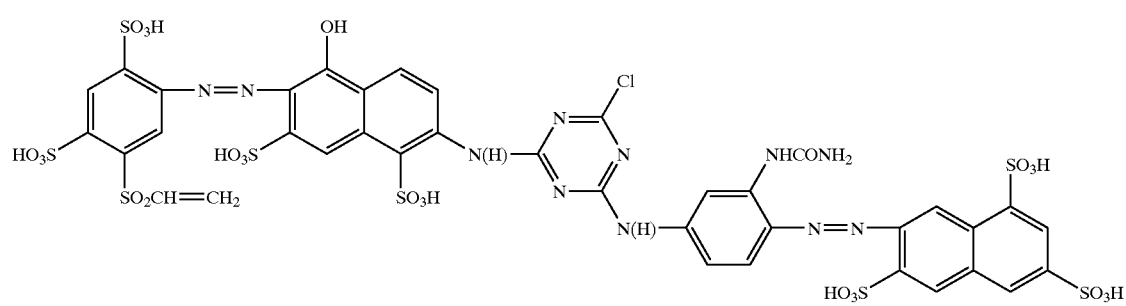

An azo dye of the formula (I), given and defined above may be prepared by a process which comprises reacting a triazine dye of the formula (II)

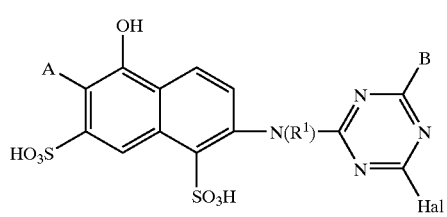

(II)

wherein each of $R^1$, A and B is as defined above and Hal is a halogen atom;
with an azo dye of the formula (III)

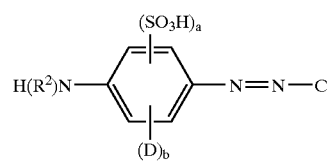

(III)

wherein each of a, b, $R^2$, C and D is as defined above.

The process is preferably carried out in an aqueous solution at pH 4–6 and at a temperature of at least 30° C.

The triazine dye of the formula (II) may be prepared by diazotising an amine of the formula (IV)

A—NH$_2$   (IV)

wherein A is as defined above and coupling the diazotised amine of the formula (IV) to a triazine compound of the formula (V)

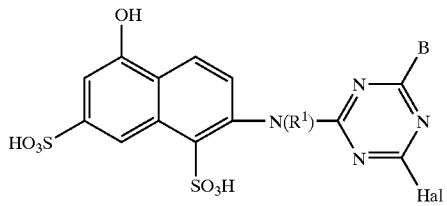

(V)

wherein each of $R^1$ and B is as defined above and Hal is a halogen atom, to obtain the triazine dye of the formula (II).

Typically, diazotisation of the amine is carried out in an acid medium at a pH of about 2–5, using, for example, acetic, propionic or hydrochloric acid in the presence of a nitrosating agent, such as nitrosyl sulphuric acid, an alkali metal nitrite (e.g sodium nitrite) or a $C_{1-4}$ alkyl nitrite (e.g. methyl nitrite) at a temperature of from −10° C. to 10° C.

The coupling reaction may be carried out by adding the diazotised amine of the formula (IV), to the triazine compound of the formula (V) in water at a temperature of from 0 to 10° C.

The triazine compound of the formula (V), given and defined above, may be prepared by reacting an aminonaphthalenesulphonic acid compound of the formula (VI)

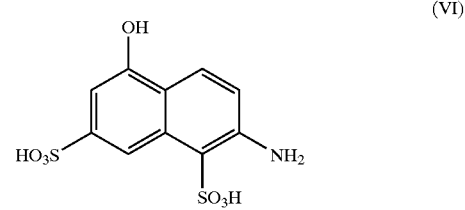

(VI)

with a cyanuric halide of the formula (VII)

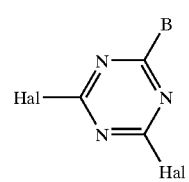

(VII)

wherein each Hal is a halogen atom and B is as defined above, to form the triazine compound of the formula (V).

The reaction may be carried out by adding the aminonaphthalene sulphonic acid compound of the formula (VI) dropwise to a slurry of the cyanuric halide of the formula (VII) in an ice/water/acetone mixture.

When in the azo dye of the formula (III), a is 1 or 2, b is zero and C is the residue of a heteroaromatic coupling component the azo dye of the formula (III) may be prepared by acylating a diamine of the formula (VIII)

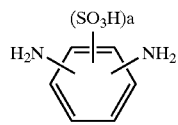
(VIII)

where a is zero, 1 or 2 to form an amine of the formula (IX),

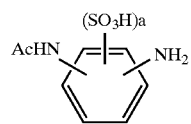
(IX)

where a is zero, 1 or 2 and Ac is an acyl group, diazotising the amino of the formula (IX) and coupling the diazotised amine to a coupling agent of the formula

C—H where C is as defined above to form, after deacetylation, the azo dye of the formula (III).

When, in the azo dye of the formula (III), a is zero or 1, b is 1 or 2 and D, or each D independently, is ureido, ($C_{1-4}$ alkyl)carbonyl amino, $C_{1-4}$ alkoxy or $C_{1-4}$ alkylthio and the Group C is a group (iv)

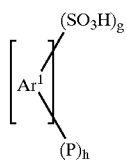
(iv)

wherein each of $Ar^1$, P, g, and h is as defined above, the azo dye of the formula (III) may be prepared by diazotising an amine of the formula (X)

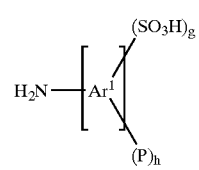
(x)

wherein each of $Ar^1$, P, g and h is as defined above, and coupling the diazotised amine with a coupling agent of the formula (XI)

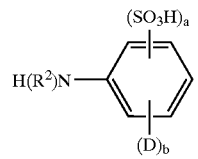
(XI)

where D is as defined above, a is zero or 1 and b is 1 or 2.

In either of the above reactions, the diazotisation and coupling may be carried out in a manner analogous to that described in relation to the preparation of the triazine dye of the formula (II).

Dyes embodying the invention may be applied alone or in admixture with other dyestuffs.

Although in this specification, dye formulae have been shown in the form of their free acid, the invention also includes dyes and processes using dyes in the salt form, particularly their salts with alkali metals such as the potassium, sodium, lithium or mixed sodium/lithium salt.

The dyes may be used for dyeing, printing or ink-jet printing, for example of textile materials and paper.

The process for colouration is preferably preformed at a pH of 7.1 to 13, more preferably 10 to 12 pH levels above 7 can be achieved by performing the process for colouration in the presence of an acid-binding agent. They can be applied at any temperature from room temperaure (e.g. 15° C.) to 80° C., preferably from 40 to 60° C.

The substrate may be any of fibre material such as a textile material, leather, paper, hair or film, but is preferably a natural or artifiical textile material containing amino or hydroxyl groups, for example textile material such as wool, silk, polyamides and modified polyacrylonitrile fibres, and more preferably a cellulose, for example, that commercially available as Tencel. For this purpose the dyes can be applied to the textile materials at a pH above 7 by, for example, exhaust dyeing, padding or printing. Textile materials are coloured bright shades and possess good fastness to light and wet treatments such as washing.

The new dyes are particularly valuable for colouring cellulosic textile materials. For this purpose, the dyes are preferably applied to the cellulosic textile material at a pH above 7 in conjunction with a treatment with an acid-brinding agent.

Preferred acid-binding agents include alkali metal carbonates, bicarbonates, hydroxides, metasilicates and mixtures thereof, for example sodium bicarbonate, sodium carbonate, sodium metasilicate, sodium hydroxide and the corresponding potassium salts. The dyes benefit from excellent build-up and high fixation.

The new dyes can be applied to textile materials containing amine groups, such as wool and polyamide textile materials, from a neutral to mildly alkaline dyebath. The dyeing process can be carried out at a constant or substantially constant pH, that it to say the pH of the dyebath remains constant or substantially constant during the dyeing process, or if desired the pH of the dyebath can be altered at any stage of the dyeing process.

The dyes may be in liquid or solid form, for example in granular or powdered form.

According to yet another aspect of the invention there is provided a process for colouring a fibre material containing a group reactive with a reactive dye or a fibre blend containing the fibre material, which method comprises applying thereto a dye of the formula (I), given and defined above, preferably at a pH above 7.

Preferred embodiments of the invention will now be described in more detail with reference to the following Examples, in which all parts are by weight unless otherwise stated.

EXAMPLE 1
Preparation of the dye:
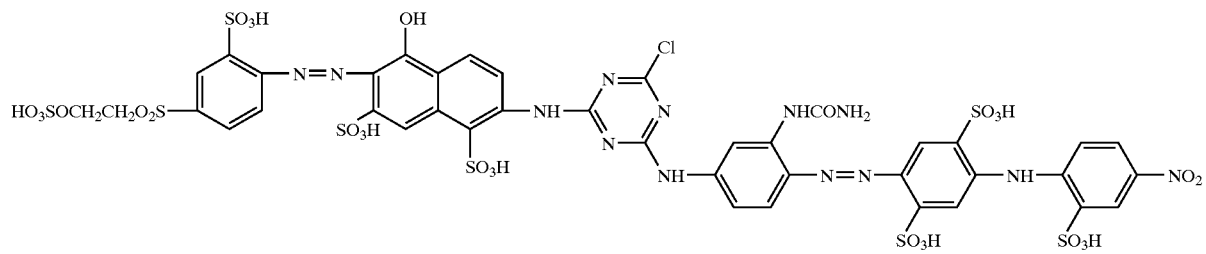
The process may be represented by the following reaction scheme.
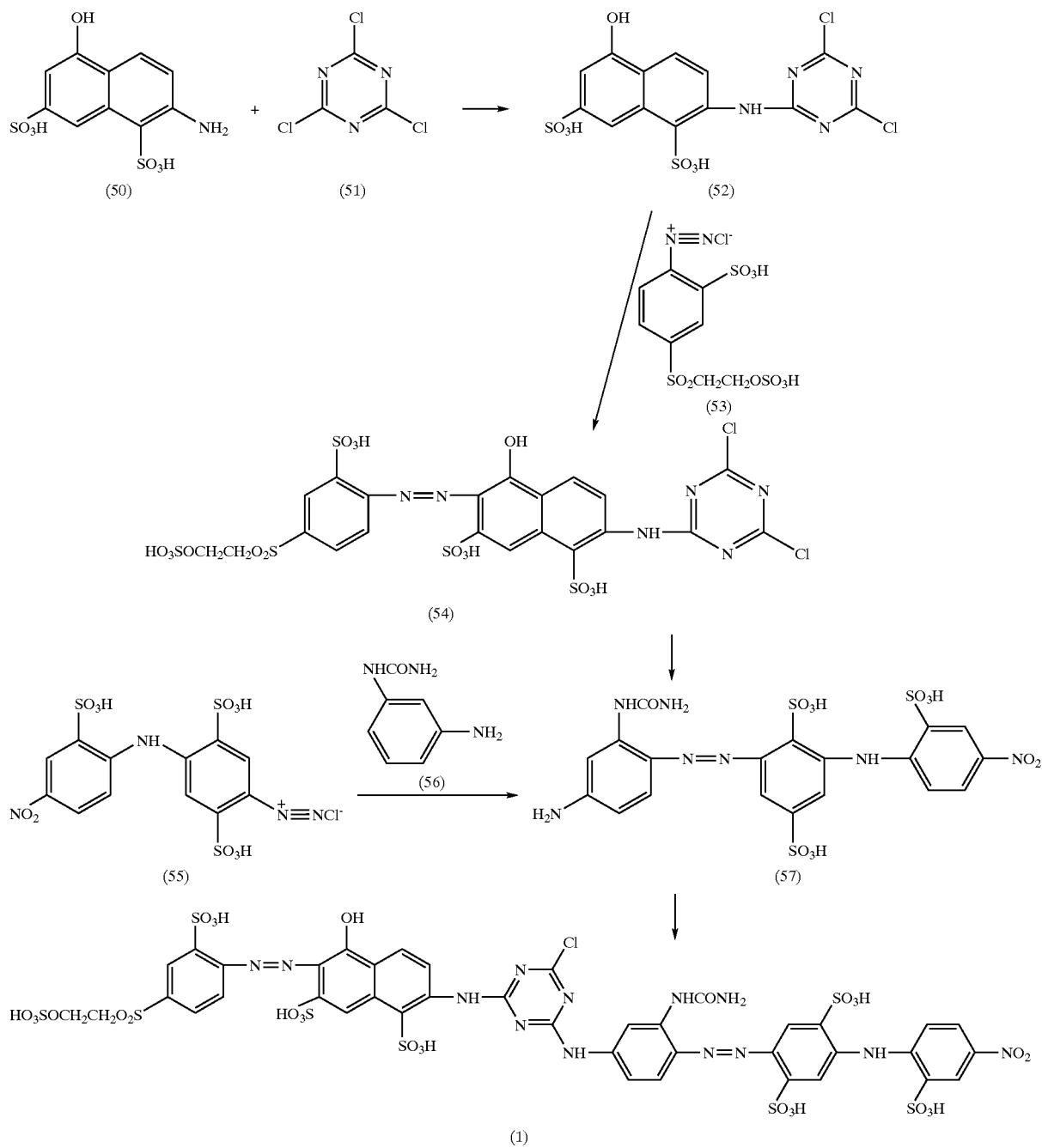

A solution of 2-amino-5-hydroxy-1,7-naphthalene disulphonic acid (50) (39.0 g, 0.8 mol) in water (500 mls) was added dropwise to a slurry of cyanuric chloride (51) (16.2 g, 0.088M) in an ice/water/acetone mixture and allowed to stir for 1 hr to provide a solution of the dichlorotriazinyl complex (52).

Separately, 2N sodium nitrite solution was added dropwise to an ice cold slurry of 2-amino-5-(β-sulphatoethylsulphone) benzenesulphonic acid (45.2 g, 0.093M) (4) and concentrated HCl (3 mls) in water (500 mls). After 1 hr, excess nitrous acid was destroyed by the addition of sulphamic acid, leaving a solution of the diazonium salt (53). The solution of the diazonium salt (53) was then added to the dichlorotriazine (53) solution and the mixture allowed to warm to room temperature while maintaining the pH at 6. After 4 hrs the resulting precipitate was filtered off and dried to give the reddish yellow dichlorotriazinyl dye (70 g) (54). Analytical data were in full agreement with the expected structure.

2N sodium nitrite solution was added dropwise to an ice cold solution of 2(2-sulpho-4-nitrophenylamino)-5-amino-1,4-benzene disulphonic acid (6.9 g, 0.01 mol) and concentrated HCl (3 mls) in water (100 mls). After 1 hr, excess nitrous acid was destroyed by the addition of sulphamic acid leaving a solution of the diazonium salt (55). The solution of the diazonium salt (55) was then added to a slurry of meta-ureidoaniline (56) (2.8 g, 0.01 mol) in water (100 mls) and the mixture allowed to warm to room temperature over night maintained at pH 4. The product was precipitated by the addition of methylated spirits, filtered off and dried to give the monoazoamine dye (57) (9.1 g). Analytical data were in full agreement with the expected structure.

An aqueous solution of dichlorotriazine dye (54) (5.0 g, 0.0045 mol) and monoazoamine dye (57) (5.6 g, 0.0045 mol) in water (100 mls) maintained at pH 5 was heated at 65° C. for 2 hrs. The resulting solution was cooled and the product precipitated by the addition of methylated spirits. The precipitate was filtered off and dried to give the reactive dye (1) of Example 1 (6.6 g) λmax=470 nm ∈=76306. Analytical data were in full agreement with the expected structure.

EXAMPLE 2

Preparation of the dye:

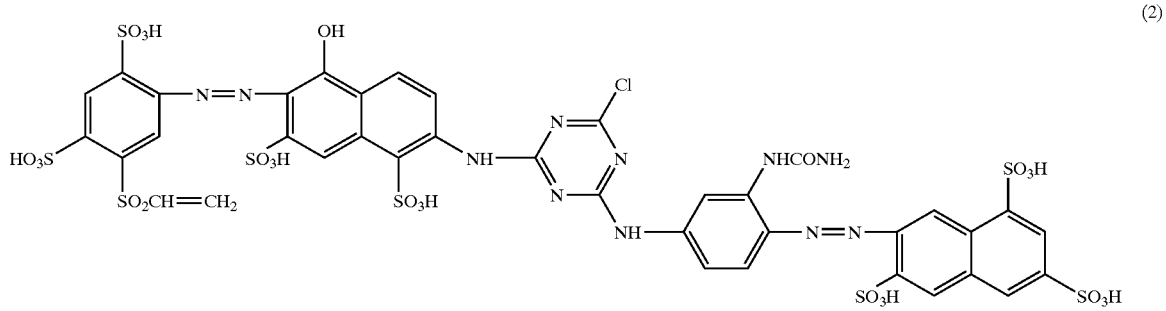

(2)

The process may be represented by the following reaction scheme.

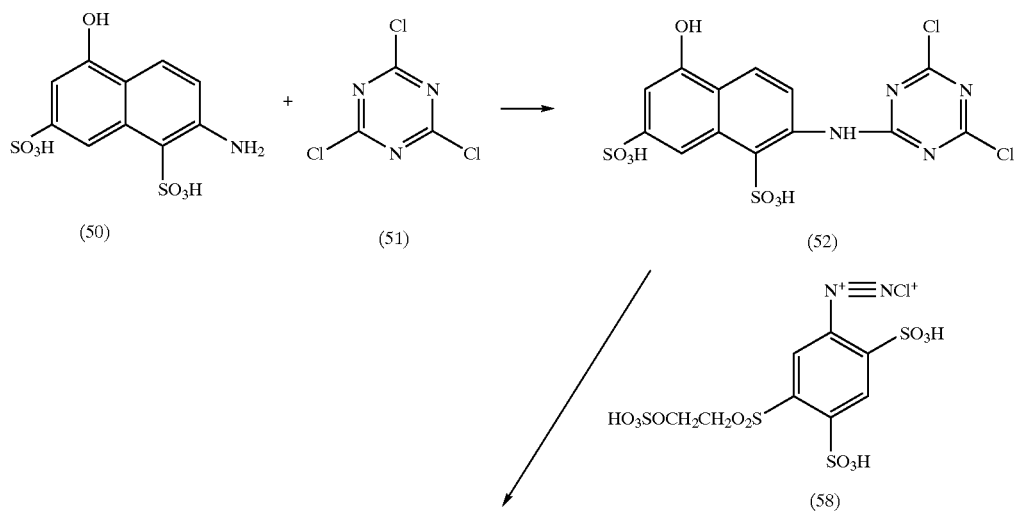

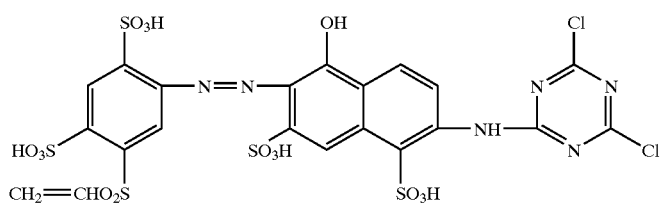

(59)

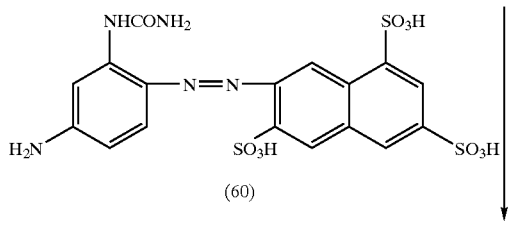

(60)

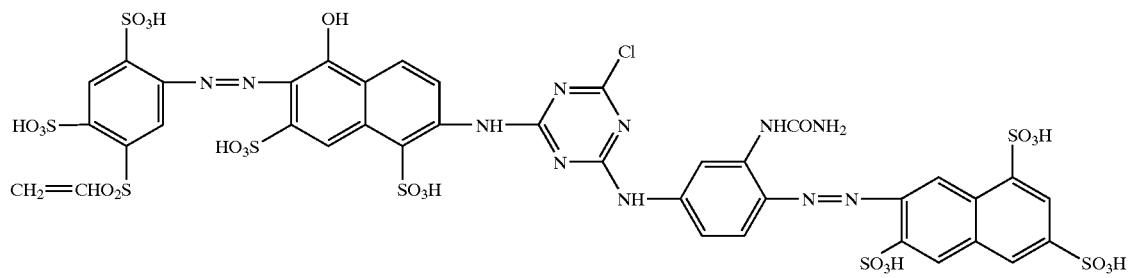

(2)

A solution of 2-amino-5-hydroxy-1,7-naphthalene disulphonic acid (50) (9.72 g, 0.02 mol) in water (100 mls) was added dropwise to a slurry of cyanuric chloride (51) (4.1 g, 0.022 mol) in an ice/water/acetone mixture and allowed to stir for 1 hr furnishing a solution of the dichlorotriazinyl complex (52).

A slurry of 6-amino-4-(β-sulphatoethylsulphone)-1,3-benzenedisulphonic acid (16.5 g, 0.037 mol) and $NaNO_2$ (0.041 mol) in water (150 mls) was added dropwise to ice/water (150 g) and concentrated HCl. After 30 mins excess nitrous acid was destroyed with sulphamic acid, leaving a solution of the diazonium salt (58). ⅔ of the diazonium salt (58) solution was added to the dichlorotriazine solution and the mixture allowed to warm to room temperature maintaining the pH at 6. After 1 hr the resulting precipitate was filtered off and shown to be the dichlorotriazinyl intermediate (59).

A solution of a monoazoamine dyebase (60) (0.007 mol) and the dichlorotriazine (59) (0.009 mol) in water (250 mls) was heated to 50° C. and the pH maintained at 6 for 4 hrs. The product was precipitated by the addition of methylated spirits, filtered off and dried to give the reactive dye (2) of example 2 (10.6 g) λmax=464 nm ε=55500. Analytical data were in full agreement with the expected structure.

EXAMPLE 3

Preparation of the dye:

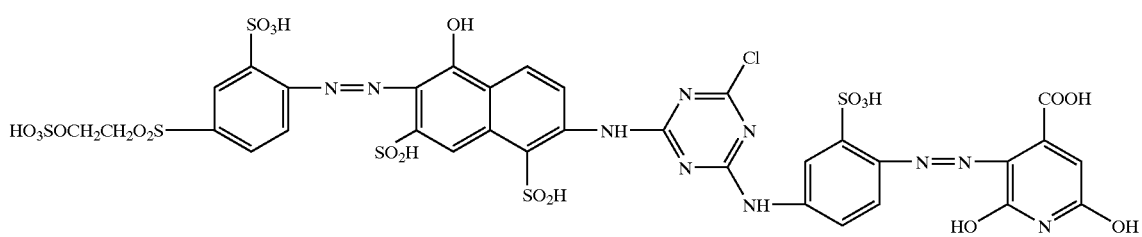

(35)

The process may be represented by the following reaction scheme.

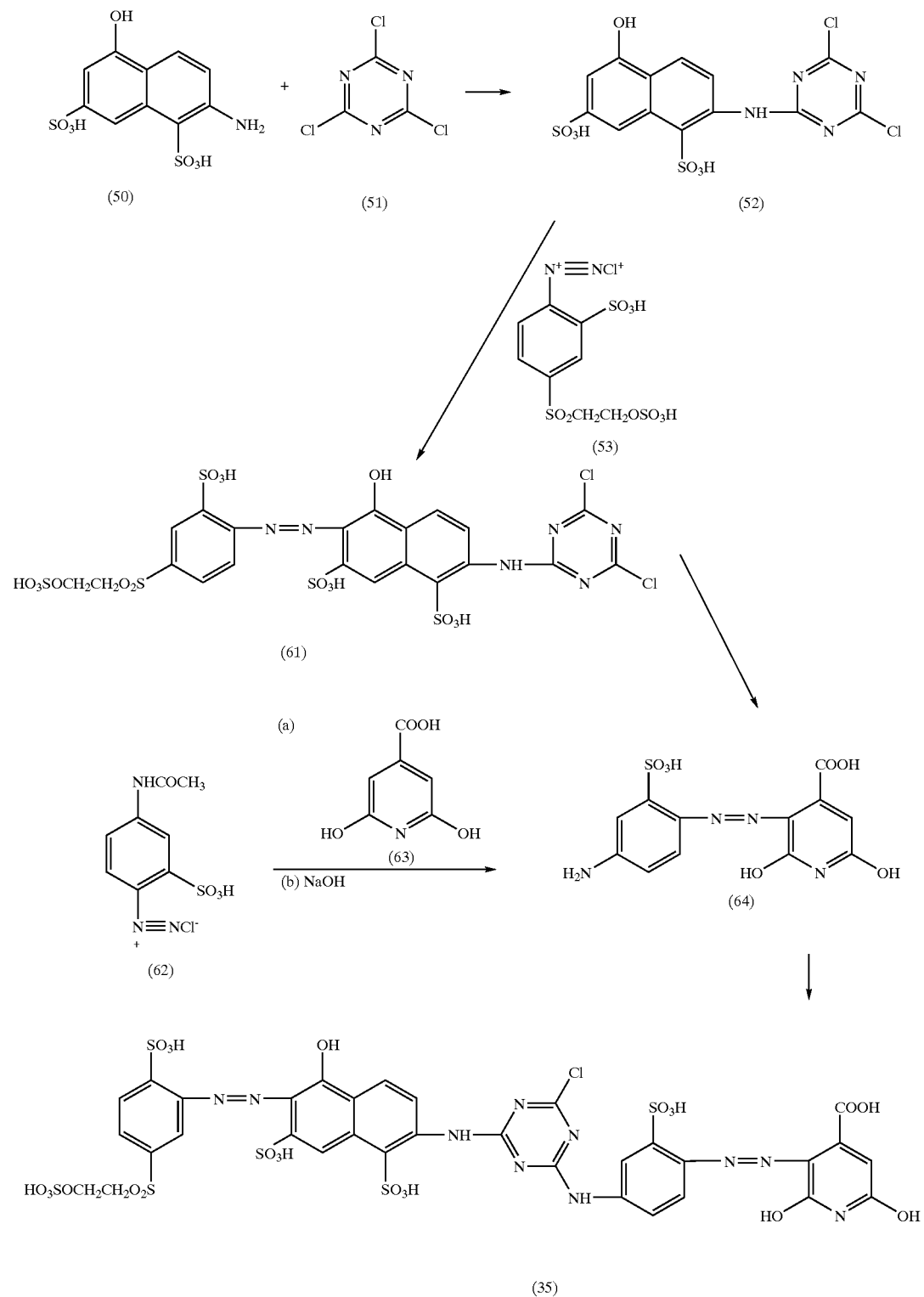

2N NaNO₂ (18 mls, 0.036 mol) was added dropwise to a solution of 2-amino-5-acetamido-benzene sulphonic acid (14 g, 0.033 mol) in water (250 mls) with concentrated HCl (8.5 mls), cooled to 0° C. The solution was stirred cold for 2 hrs before destroying excess nitrous acid by addition of sulphamic acid, to give a solution of a diazonium salt (62).

Half of the available diazonium salt solution (62) was added slowly to a stirred solution of citrazinic acid (63) (2.55 g, 0.016 mol) in water (100 mls) adjusted and maintained at pH7.

After 30 mins the coupling was complete and a monoazo-N-acetylamino dye base was precipitated by the addition of isopropyl alcohol. The N-acetyl dyebase was then dissolved in 2N sodium hydroxide and heated at 60° C. for 2 hrs before cooling and acidifying to pH2 with concentrated HCl to precipitate a dark solid. The solid was filtered off and dried to give the monoazoamino dyebase (64).

An aqueous solution of a dichlorotriazine dye (61) (3 g, 0.003 mol, prepared as described in Example 1) and the monoazoamino dyebase (64) (1.2 g, 0.003 mol) in water (100 mls) was adjusted to pH5 and heated at 60° C. for 2 hrs.

The product was precipitated by addition of methylated spirits, filtered off and dried to give the reactive dye (35) of Example 3 as an orange powder (3.5 g) λmax=460 nm ε=62000. Analytical data were in full agreement with the expected structure.

EXAMPLE 4

Preparation of the dye:

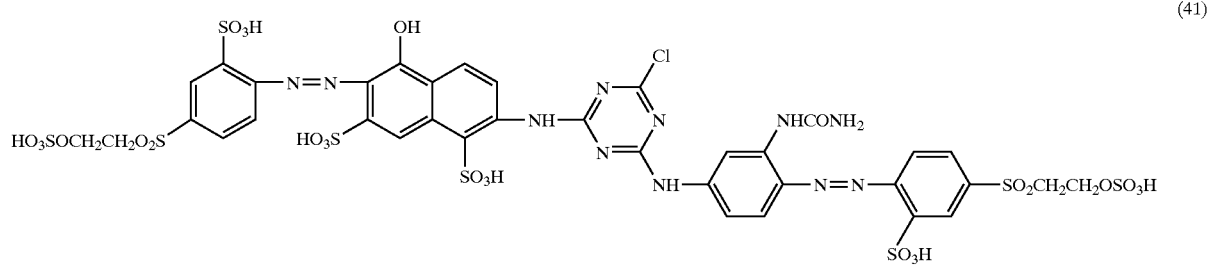

(41)

The proceess may be represented by the following reaction scheme.

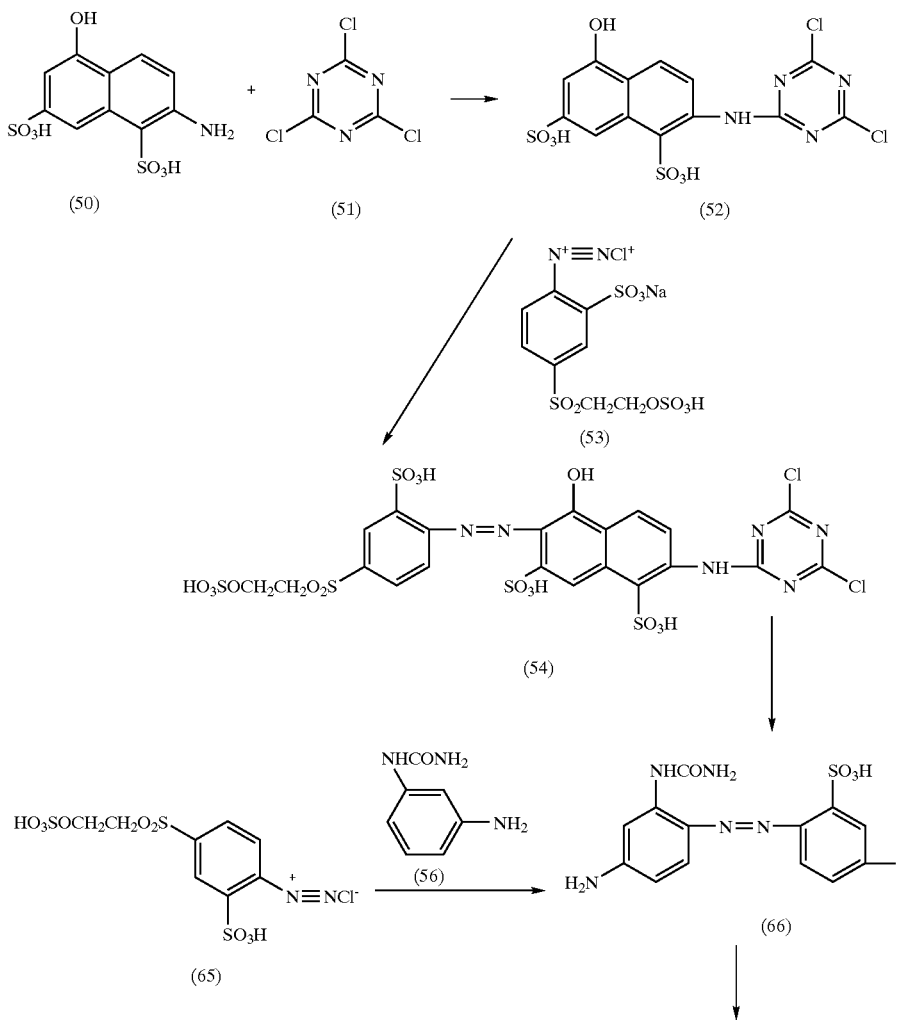

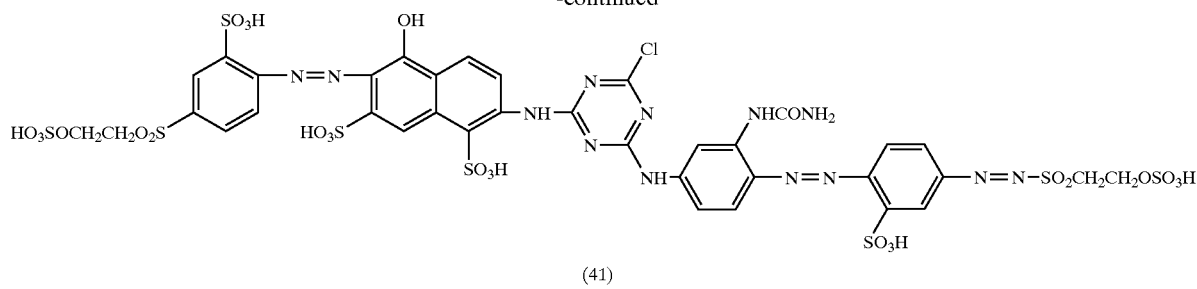

(41)

Reddish—yellow dichlorotriazinyl dye (54) was prepared as in Example 1. 2N sodium nitrite solution was added dropwise to an ice cold solution of 2-amino-5-(β-sulphatoethylsulphone) benzene-sulphonic-acid (16.75 g, 0.025 mol) and concentrated HCl (6 mls) in water (200 mls). After 1 hour, excess nitrous acid was destroyed by the addition of sulphamic acid leaving a solution of the diazonium salt (65). The solution of the diazonium salt (65) was then added to a slurry of meta-ureidoaniline (56) (6.75 g, 0.025 mol) in water (100 mls) and the mixture allowed to warm to room temperature over 2 hours maintained at pH 5.5. The product was precipitated by the addition of methylated spirits, filtered off and dried to give the monoazoamine dye (66) (14.1 g). Analytical data were in full agreement with the expected structure.

An aqueous solution of the dichlorotriazinyl dye (54.) (5.0 g, 0.0053 mol) and the monoazoamine dye (66) (5.4 g, 0.0053 mol) in water (200 mls) maintained at pH5 was heated at 50° C. for 5 hours. The resulting solution was cooled and the product precipitated by the addition of methylated spirits. The precipitate was filtered off and dried to give the reactive dye (41) (6.0 g) λmax=462 nm ε=50000. Analytical data were in full agreement with the expected structure.

EXAMPLES 5–45

In each of the following dyes, a triazine ring carries respective first and second yellow monoazo dye components, a first of which is derived from sulpho-J-acid as a coupling component. The second yellow monoazo dye components are also derived from a coupling component and a diazotized amine component.

The dyes of Examples 5–36 and 41–45 (dyes 3, 5–12, 14–16, 18–19, 21–34, 36–40 and 42–45) were prepared by the method of Example 1, so that the residue derived from the coupling component is linked to the triazine ring).

The dyes of Examples 36–40 (dyes 4, 13, 17, 20 and 35) were prepared by the method of Example 3, so that the residue derived from the diazotised amine component is linked to the triazine ring.

Each of the dyes of Examples 5–45 (dyes 3–34, 36–40 and 42–45) has the formula

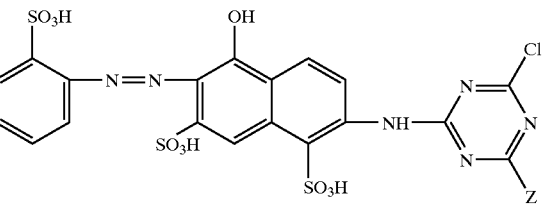

| Example | Z | Dye | λ (max) |
|---|---|---|---|
| 5 | 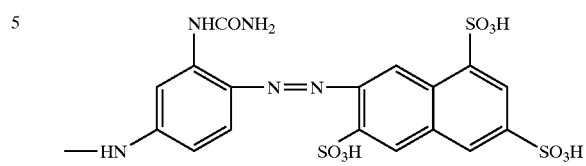 | (3) | 465 |
| 6 | 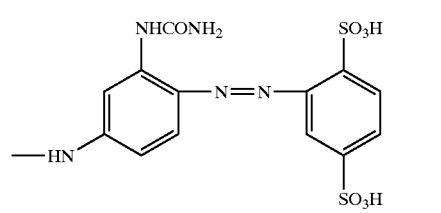 | (5) | 477 |

-continued

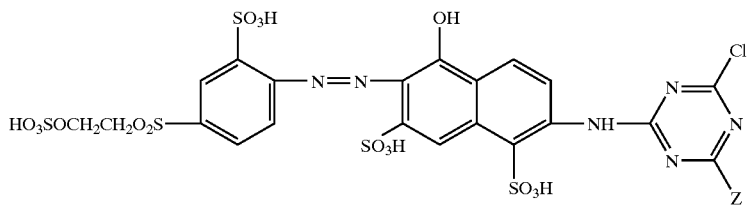

| Example | Z | Dye | λ (max) |
|---|---|---|---|
| 7 | (structure with NHCONH₂, SO₃H, naphthalene disulfonic) | (6) | 476 |
| 8 | (structure with NHCOCH₃, OCH₃, naphthalene trisulfonic) | (7) | 472 |
| 9 | (structure with NHCOCH₃, benzene disulfonic) | (8) | 472 |
| 10 | (structure with NHCOCH₃, OCH₃, benzene disulfonic) | (9) | 470 |
| 11 | (structure with NHCONH₂, benzene monosulfonic) | (10) | 471 |
| 12 | (structure with NHCONH₂, benzene disulfonic) | (11) | 468 |
| 13 | (structure with NHCONH₂, benzene monosulfonic) | (12) | 470 |

-continued
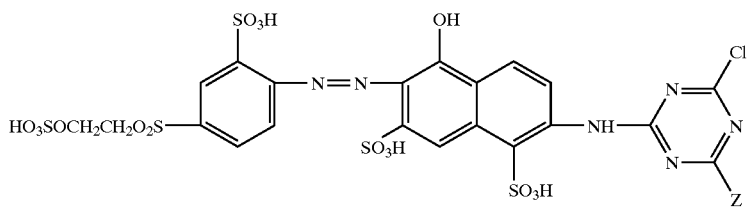
| Example | Z | Dye | λ (max) |
|---|---|---|---|
| 14 | 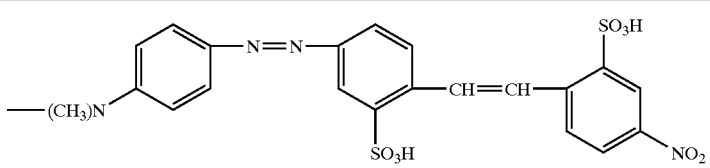 | (14) | 470 |
| 15 | 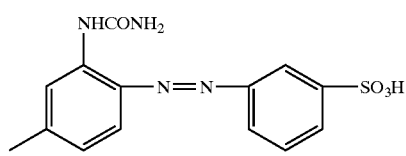 | (15) | 472 |
| 16 | 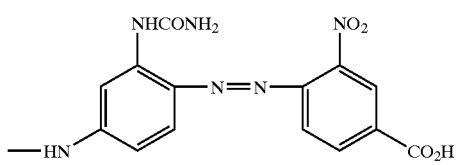 | (16) | 473 |
| 17 | 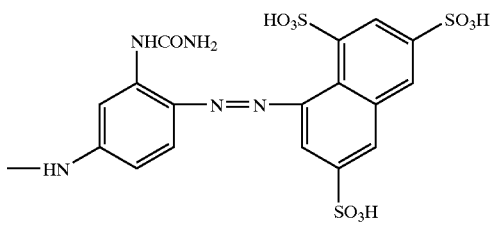 | (18) | 473 |
| 18 | 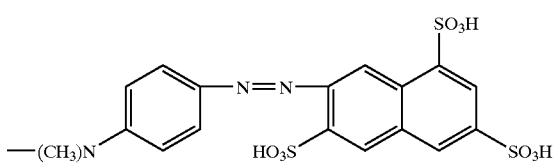 | (19) | 473 |
| 19 | 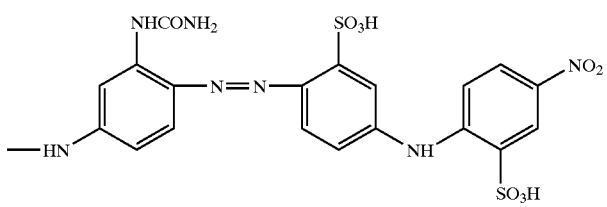 | (21) | 469 |
| 20 | 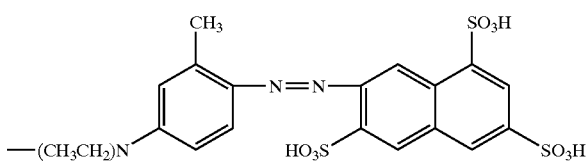 | (22) | 474 |

-continued
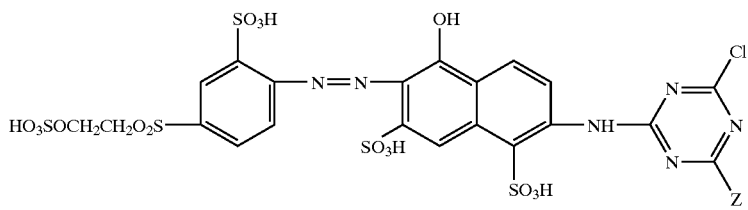
| Example | Z | Dye | λ (max) |
|---|---|---|---|
| 21 | 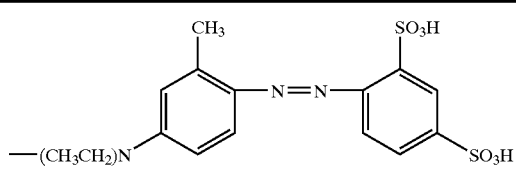 | (23) | 474 |
| 22 | 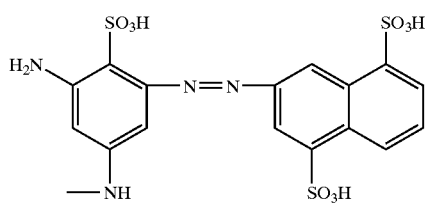 | (24) | 474 |
| 23 | 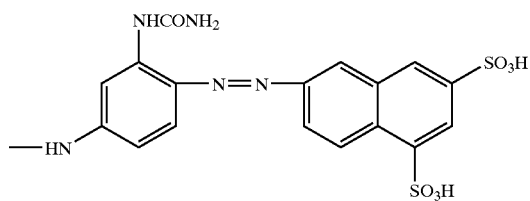 | (25) | 406 |
| 24 | 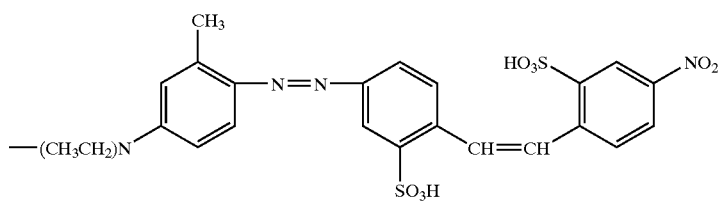 | (26) | 470 |
| 25 | 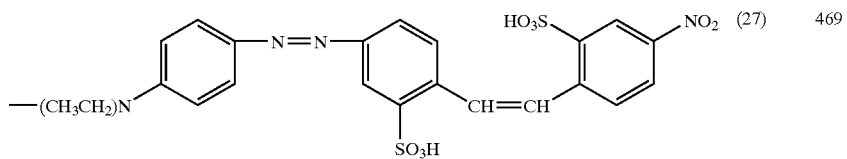 | (27) | 469 |
| 26 | 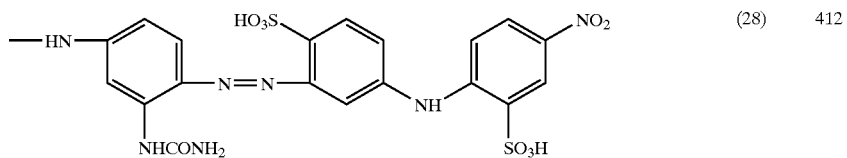 | (28) | 412 |
| 27 | 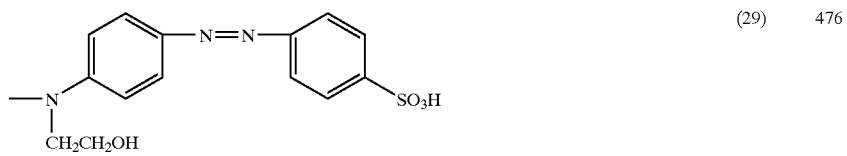 | (29) | 476 |

-continued

| Example | Z | Dye | λ (max) |
|---|---|---|---|
| 28 | —(CH₃CH₂)N—⟨C₆H₄⟩—N=N—⟨C₆H₄⟩—SO₃H | (30) | 475 |
| 29 | —(CH₃CH₂)N—⟨C₆H₄⟩—N=N—naphthalene(SO₃H)₂ | (31) | 473 |
| 30 | —HN—⟨C₆H₃(NHCONH₂)⟩—N=N—⟨C₆H₃(CO₂H)(SO₃H)⟩ | (32) | 470 |
| 31 | —HN—⟨C₆H₃(NHCONH₂)⟩—N=N—⟨C₆H₃(SO₃H)(NO₂)⟩ | (33) | 466 |
| 32 | —(CH₃CH₂)N—⟨C₆H₃(CH₃)⟩—N=N—⟨C₆H₃(SO₃H)(NO₂)⟩ | (34) | 476 |
| 33 | —(H₃C)N—⟨C₆H₄⟩—N=N—naphthalene(SO₃H)₂ | (36) | 473 |
| 34 | —(CH₃CH₂)N—⟨C₆H₃(CH₃)⟩—N=N—⟨C₆H₄⟩—SO₃H | (37) | 475 |
| 35 | —(CH₃)N—⟨C₆H₄⟩—N=N—⟨C₆H₄⟩—SO₃H | (38) | 475 |

-continued
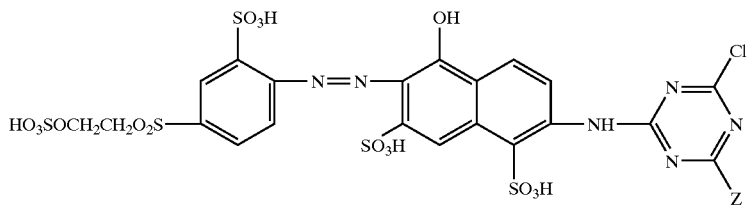
| Example | Z | Dye | λ (max) |
|---|---|---|---|
| 36 | 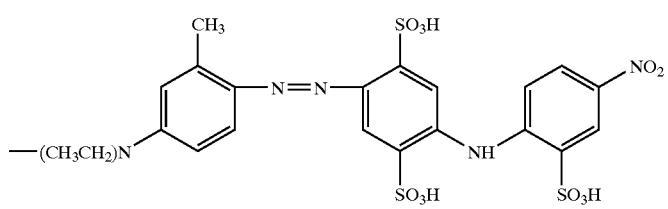 | (39) | 427 |
| 37 | 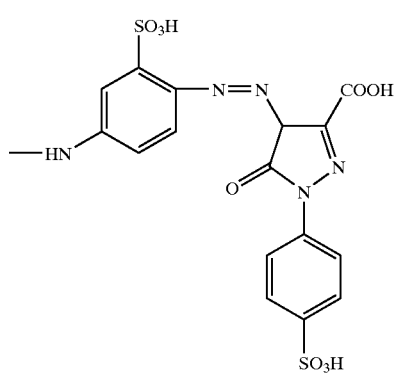 | (4) | 476 |
| 38 | 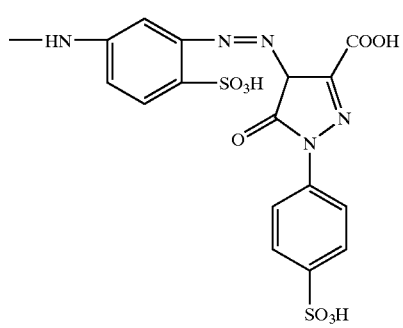 | (13) | 469 |
| 39 | 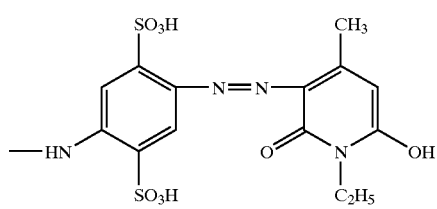 | (17) | 421 |

-continued
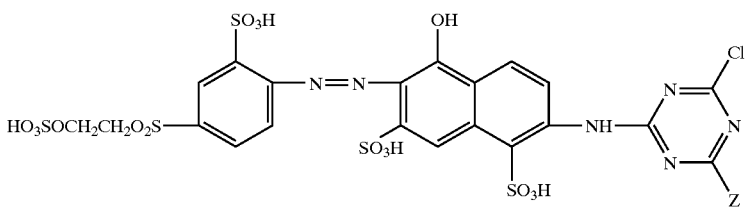
| Example | Z | Dye | λ (max) |
|---|---|---|---|
| 40 | 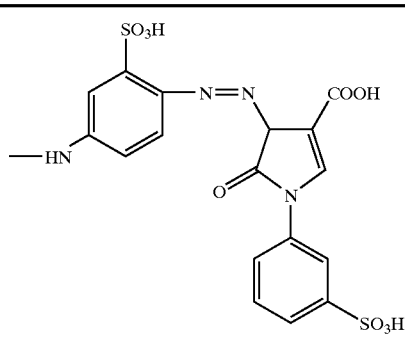 | (20) | 466 |
| 41 | 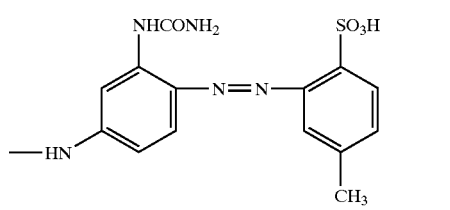 | (40) | 470 |
| 42 | 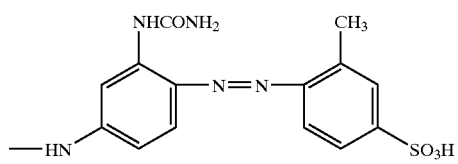 | (42) | 471 |
| 43 | 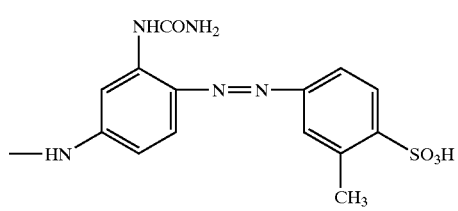 | (43) | 468 |
| 44 | 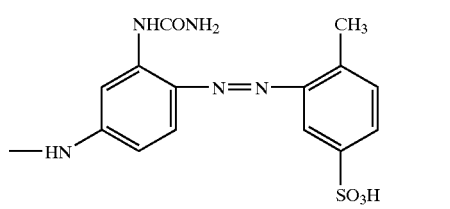 | (44) | 471 |
| 45 | 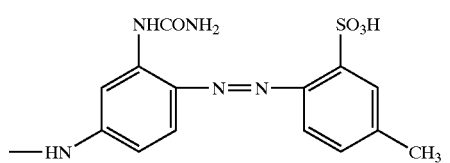 | (45) | 470 |
The above reactive dyes embodying the invention contain a first monoazo component derived from sulpho-J-acid as coupling component and a strongly electron withdrawing diazo component giving a bright yellow shade, which may be matched and thereby enhanced by a second monoazo component, itself providing a bright yellow shade. Such dyes may thus be provided with an excellent strong and bright shade. They are found also to have excellent build-up and good migration properties and are relatively inexpensive, especially given the depth of shade achieved, and easy to prepare. They also exhibit beneficial fastness properties, especially excellent light and wash fastness.

What is claimed is:

1. An azo dye of the formula (I)

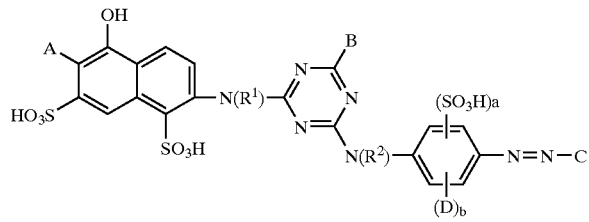

or an alkali metal salt thereof;

wherein: each of $R^1$- and $R^2$ independently is hydrogen, optionally substituted $C_{1-4}$ alkyl or optionally substituted phenyl;

A is

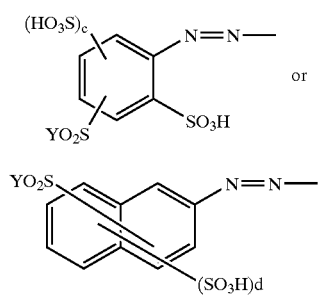

or

in which formula (i), c is zero or 1;

in which (ii), d is 1, 2 or 3 and a group $SO_3H$ is ortho to the azo group; and in which formula (i) or (ii), Y is the group —CH=CH$_2$; —CH$_2$CH$_2$U (wherein U is a leaving group); or —CH$_2$CH=CH$_2$;

B is fluorine; chlorine; the group $OR^3$ (in which $R^3$ is hydrogen, $C_{1-4}$ alkyl or phenyl); the group $NR^4R^5$ (in which each of $R^4$ and $R^5$ independently is hydrogen, $C_{1-4}$ alkyl or phenyl; or each of $R^4$, $R^5$ and N together form an optionally substituted aromatic heterocyclic ring); the group $^+N\,R^6\,R^7\,R^8$ (in which each of $R^6$, $R^7$ and $R^8$ independently is $C_{1-4}$ alkyl or phenyl or each of at $R^6$, $R^7$, $R^8$ and N together torn an optionally substituted heterocyclic ring); or the group $SR^9$ (in which $R^9$ is hydrogen, $C_{1-4}$ alkyl or phenyl)

C is an optionally substituted aromatic or hetero aromatic residue;

D is methyl, methoxy, amino, acylamino or ureido;

a is zero, 1 or 2;

b is zero, 1 or 2 and when b is 2 each D is independent of the other.

2. An azo dye according to claim 1, wherein D is methyl, methoxy, acylamino or ureido.

3. The azo dye according to claim 1, wherein A is the group

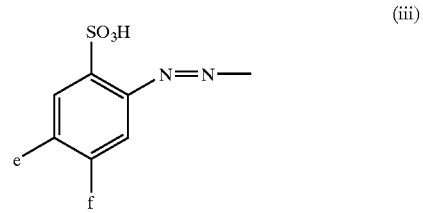

wherein e is —SO$_2$CH$_2$CH$_2$OSO$_3$H and f is absent; or e is —SO$_3$H and f is —SO$_2$CH$_2$CH$_2$OSO$_3$H.

4. The azo dye according to claim 3, wherein B is chlorine or is a 3- or 4- carboxypyridium salt derived respectively from nicotinic or isonicotinic acid.

5. The azo dye according to claim 4, wherein formula (I) is the formula ($1^1$)

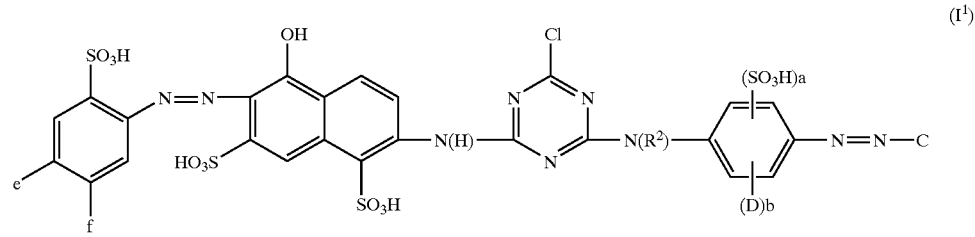

wherein each of $R^2$ is hydrogen, optionally substituted $C_{1-4}$ alkyl or optionally substituted phenyl;

C is optionally substituted aromatic or heteroaromatic residue;

D is methyl, methoxy, amino, acylamino or ureido;

a is zero, 1 or 2; and b is zero, 1 or 2 and when b is 2 each D is independent of the other.

6. The azo dye according to claim 5, wherein at least one of the groups SO$_3$H or D is ortho to the azo group linking to the group C.

7. The azo dye according to claim 6, wherein a is 1 or 2 and b is zero.

8. The azo dye according to claim 6, wherein C is a heteroaromatic group.

9. The azo dye according to claim 8, wherein the heteroaromatic group is a pyridonyl, pyrazolonyl, 2,6-diaminopyridiflyl or 4-carboxy-2,6-dihydroxypyridinyl group.

10. The azo dye according to claim 7, wherein C is a hydroxynapthalene group.

11. The azo dye according to claim 1, wherein a is zero or 1, b is 1 or 2 and D, or each D independently is ureido, ($C_{1-4}$ alkyl) carbonylamino, $C_{1-4}$ alkoxy or $C_{1-4}$ alkylthio.

12. The azo dye according to claim 4, wherein the group C is a group (iv)

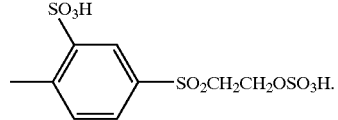
(iv)

wherein:

Ar$^1$ is an aromatic diazo component;

g is zero, 1, 2, 3 or 4;

h is zero, 1, 2, or 3; and

P, or each P independently, is $C_{1-4}$ alkyl, nitro,

—SO$_2$NR$^8$ (in which R$^8$ is hydrogen, $C_{1-4}$ alkyl or phenyl), carboxyl, cyano, SO$_2$Y$^1$ (in which Y$^1$ is vinyl, allyl or CH$_2$CH$_2$V, where V is a leaving group) or —NHAr$^2$, wherein Ar$^2$ is an aromatic residue substituted by at least one group T, the group T, or each group T independently, being selected from the group consisting of cyano, carboxyl, sulphonic acid and SO$_2$Y$^2$ wherein Y$^2$ is vinyl, allyl or CH$_2$CH$_2$W wherein W is a leaving group.

13. The azo dye according to claim 12, wherein at least one group P is a group SO$_2$Y$^1$.

14. The azo dye according to claim 13, where the group C is of the formula

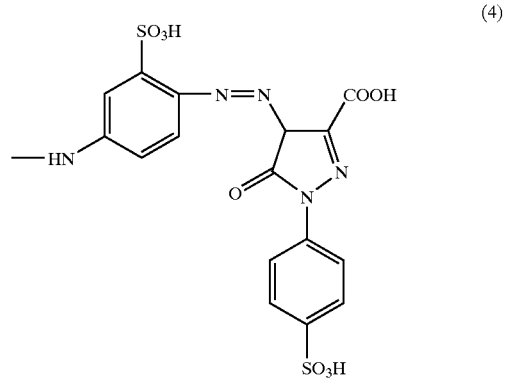

15. The azo dye according to claim 12, wherein at least one group P is a group NHAr$^2$ substituted by a group T, which group T is the group SO$_2$Y$^2$.

16. The azo dye according to claim 12, wherein at least one of the moieties Y$^1$ and Y$^2$ is present and is, independently, —CH=CH$_2$; —CH$_2$—CH=CH$_2$; —CH$_2$CH$_2$Cl; —CH$_2$CH$_2$Br; —CH$_2$CH$_2$F; —CH$_2$CH$_2$OSO$_3$H;

—CH$_2$CH$_2$OSO$_3$H; —CH$_2$CH$_2$OCOCH$_3$; —CH$_2$CH$_2$OPO$_3$H$_2$; —CH$_2$CH$_2$OCOC$_2$H$_5$;

—CH$_2$CH$_2$OSO$_2$NR$^9$ (in which R$^9$ is hydrogen, $C_{1-4}$ alkyl or phenyl); and —CH$_2$CH$_2$OSO$_2$R$^{10}$ (in which R$^{10}$ is hydrogen, $C_{1-4}$ alkyl or phenyl).

17. An azo dye of the formula

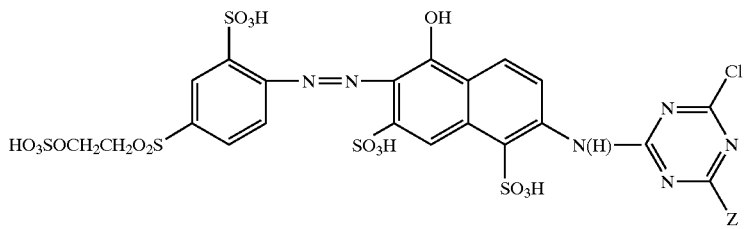

wherein Z is

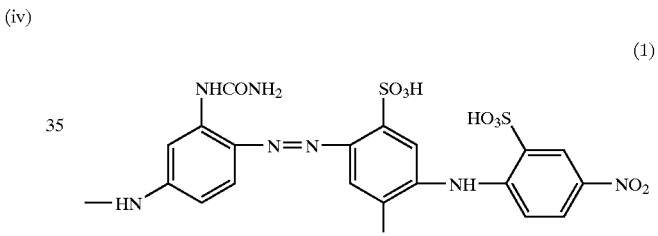
(1)

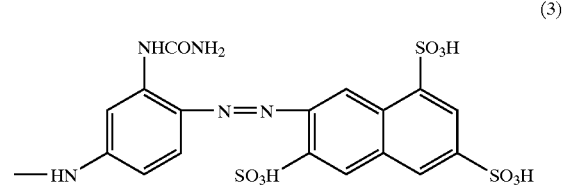
(3)

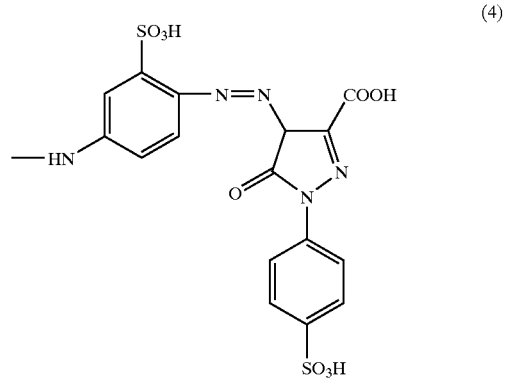
(4)

-continued
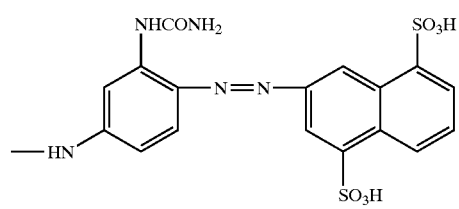
(5)
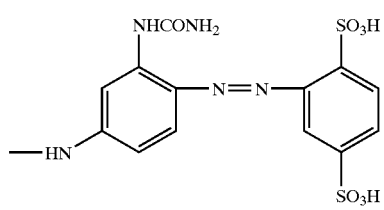
(6)
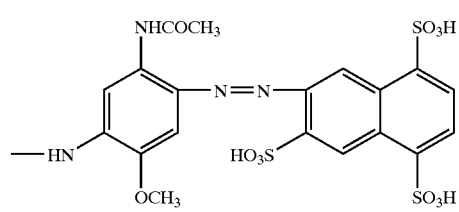
(7)
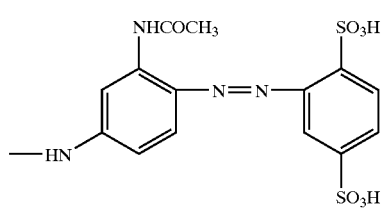
(8)
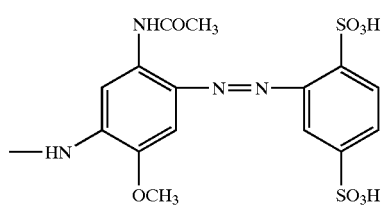
(9)
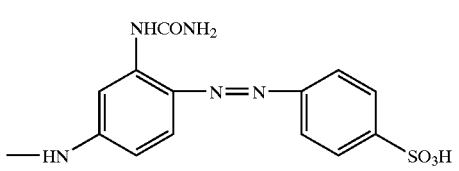
(10)
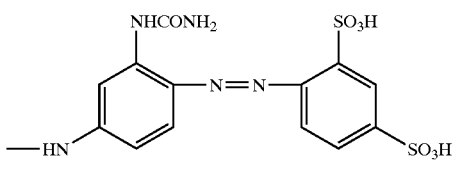
(11)
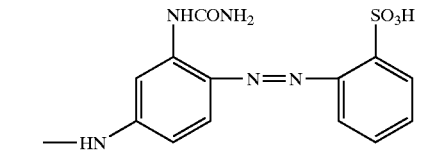
(12)
-continued
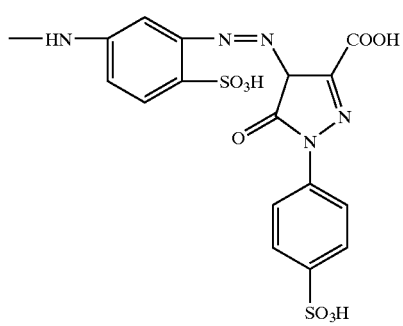
(13)
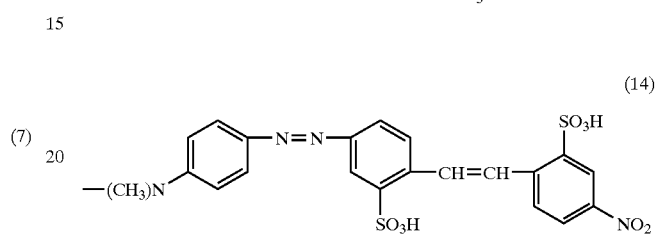
(14)
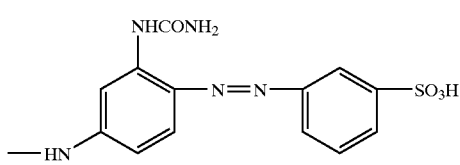
(15)
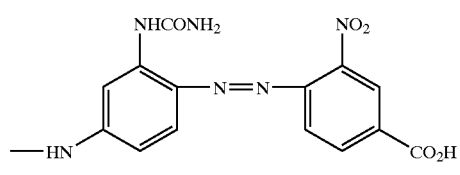
(16)
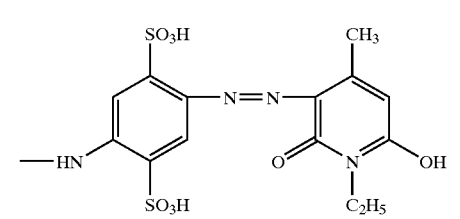
(17)
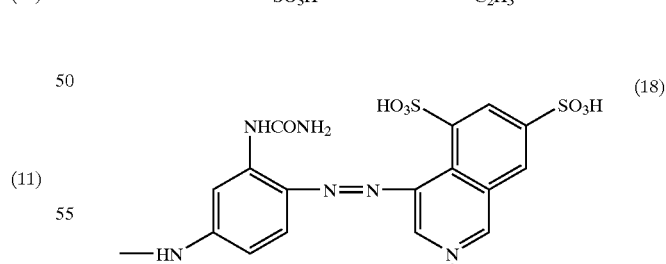
(18)
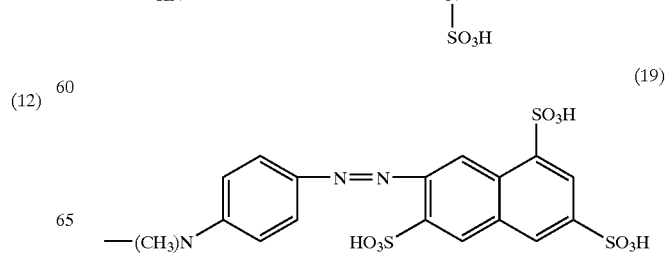
(19)

-continued
(20)
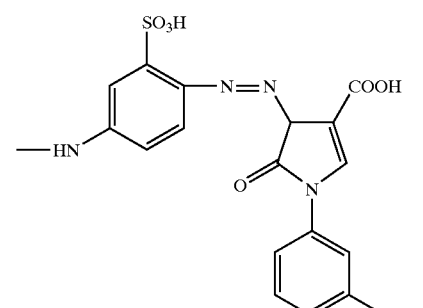
(21)
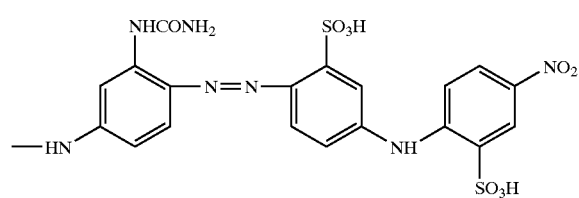
(22)
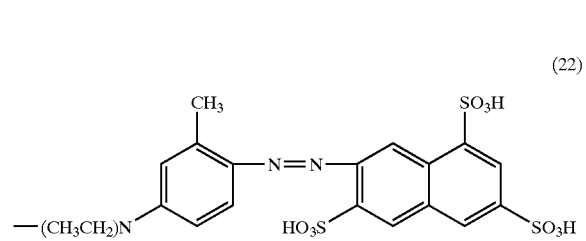
(23)
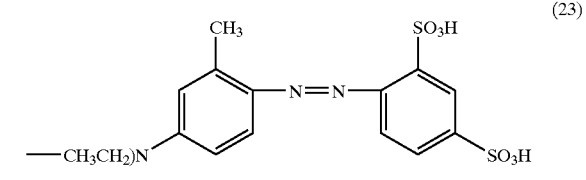
(24)
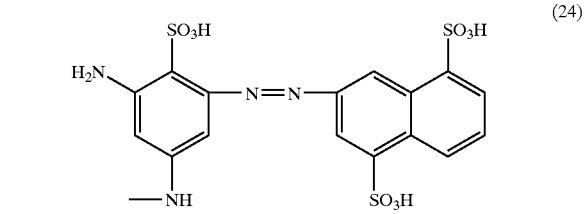
(25)
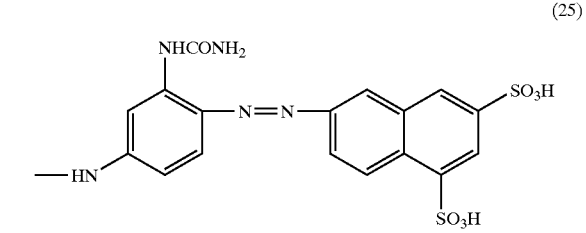
(26)
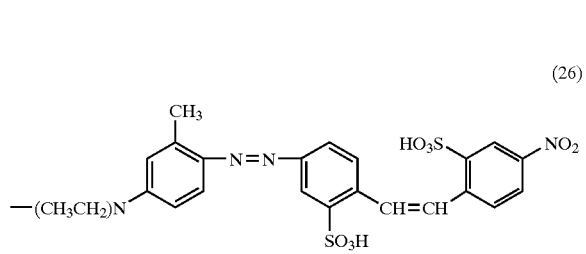
-continued
(27)
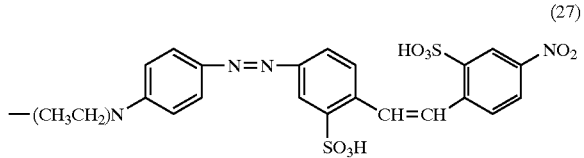
(28)
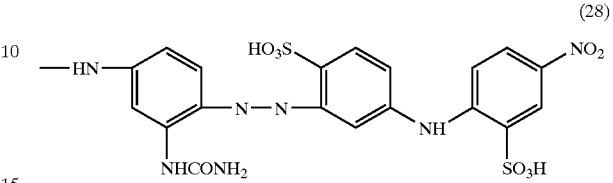
(29)
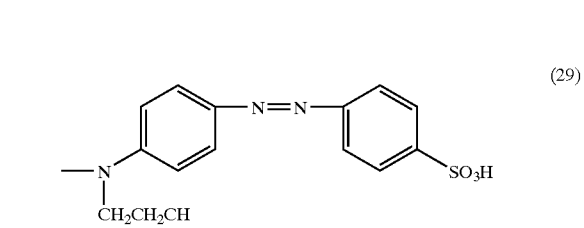
(30)
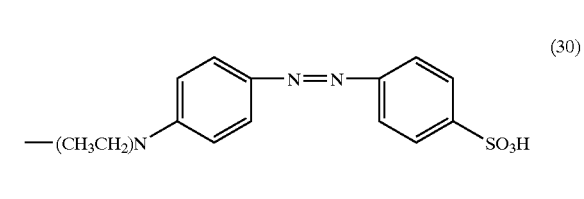
(31)
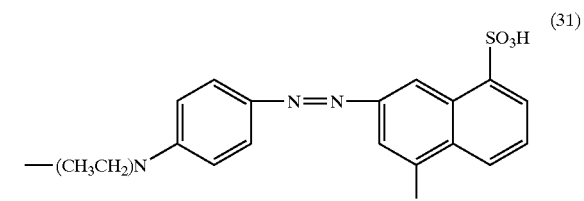
(32)
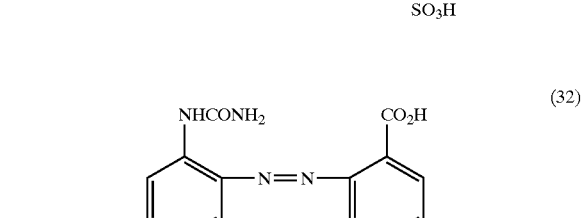
(33)
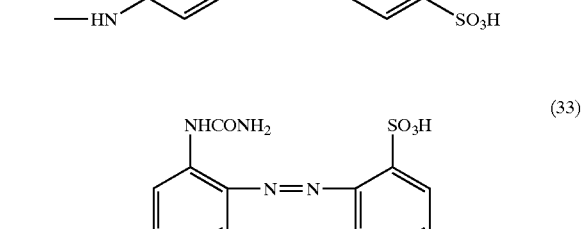
(34)
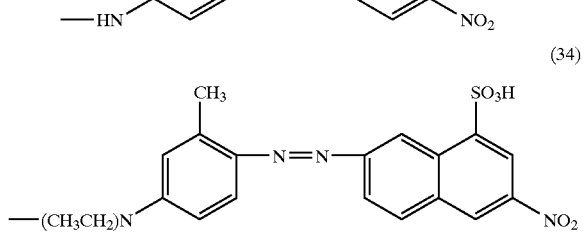

(35) 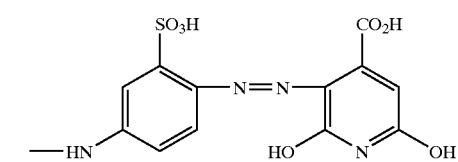
(36) 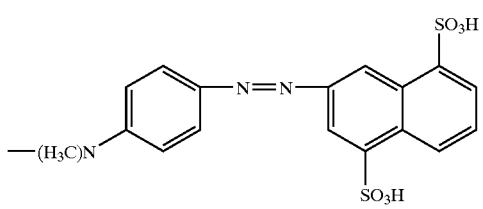
(37) 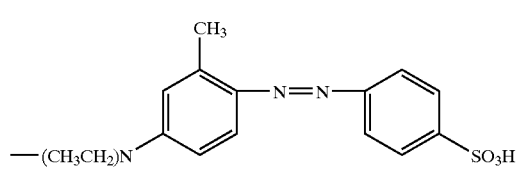
(38) 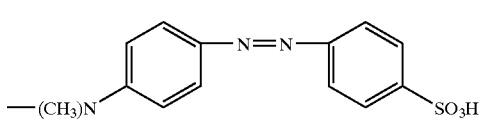
(39) 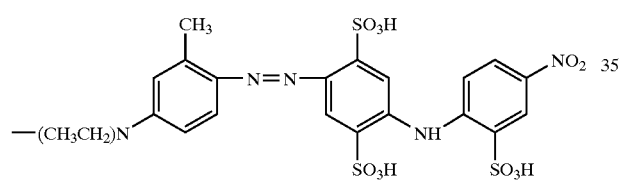
(40) 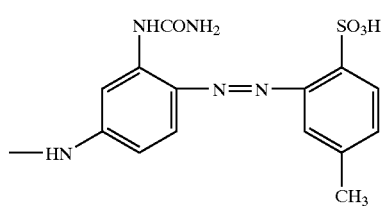
(41) 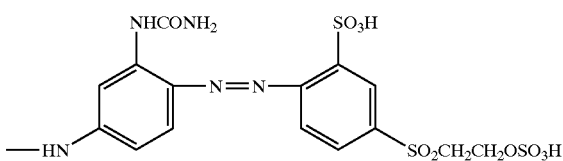
(42) 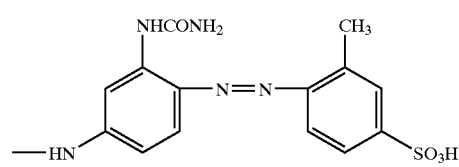
(43) 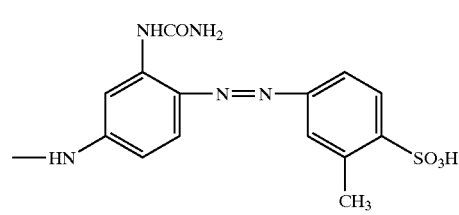
(44) 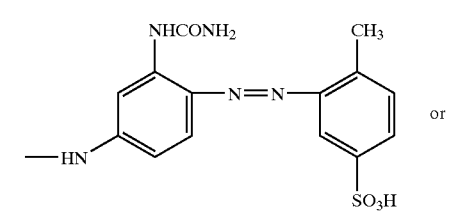
or
(45) 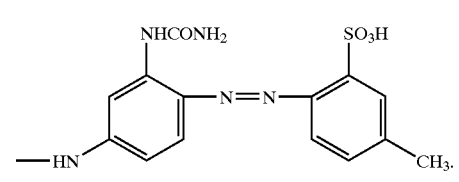
18. An azo dye of the formula
(2) 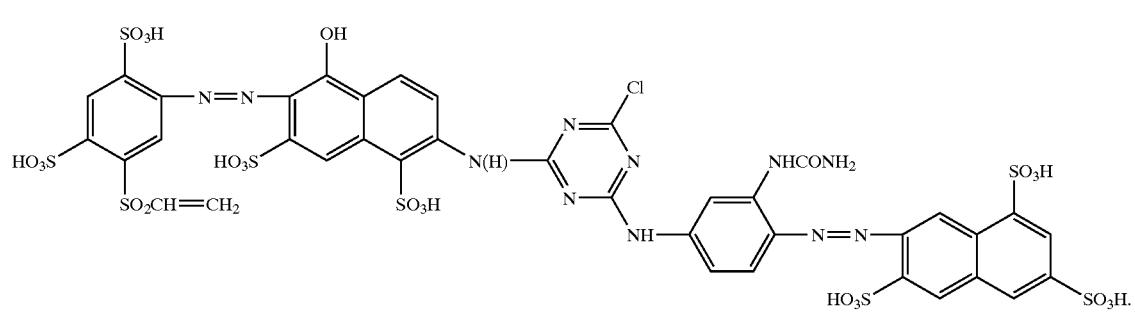

19. A process for preparing the azo dye of the formula (I), given and defined in claim 1, which process comprises reacting a triazine dye of the formula (II)

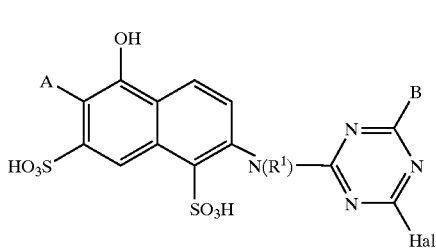
(II)

wherein each of $R^1$, A and B is as defined in claim 1 and Hal is a halogen atom;

with an azo dye of the formula (III)

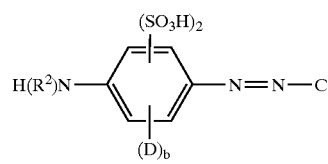
(III)

wherein each of a, b, $R^2$, C and D is as defined in claim 1.

20. The process according to claim 19 which is carried out in an aqueous solution at pH 4–6 and at a temperature of at least 30° C.

21. The process according to claim 19, which includes the preliminary step of preparing the triazine dye of the formula (II) by diazotising an amino of the formula (IV)

A—NH$_2$ (IV)

wherein

A is

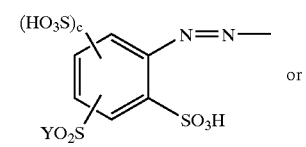
(i)

or

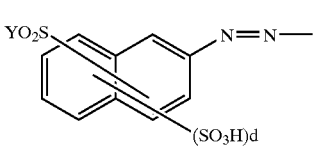
(ii)

in which formula (i), c is zero or 1;
in which formula (ii), d is 1, 2 or 3 and a group SO$_3$H is ortho to the azo group; and
in which formula (i) or (ii), Y is the group —CH=CH$_2$; —CH$_2$CH$_2$U (wherein U is a leaving group); or —CH$_2$CH=CH$_2$;

and coupling the diazotised amine of the formula (IV) to a triazine compound of the formula (V)

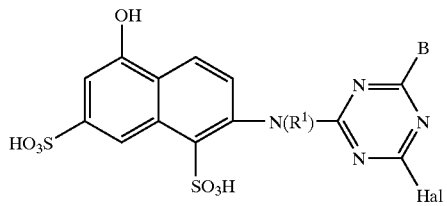
(V)

wherein
$R^1$ is hydrogen, optionally substituted $C_{1-4}$ alkyl or optionally substituted phenyl; and
B is fluorine; chlorine; the group $OR^3$ (in which $R^3$ is hydrogen, $C_{1-4}$ alkyl or phenyl); the group $NR^4R^5$ (in which each of $R^4$ and $R^5$ independently is hydrogen, $C_{1-4}$ alkyl or phenyl; or each $R^4$, $R^5$ and N together form an optionally substituted aromatic heterocyclic ring); the group $^+N R^6 R^7 R^8$ (in which each of $R^6$, $R^7$ and $R^8$ independently is $C_{1-4}$ alkyl or phenyl or each of $R^6$, $R^7$, $R^8$ and N together form an optionally substituted heterocyclic ring); or the group $SR^9$ (in which $R^9$ is hydrogen, $C_{1-4}$ alkyl or phenyl); and
Hal is a halogen atom to obtain the triazine dye of the formula (II).

22. The process according to claim 21, wherein the diazotisation is carried out in an acid medium at a pH of about 2–5, in the presence of a nitrosating agent at a temperature of from −10° C. to 10° C.

23. A process according to claim 22, wherein the coupling is carried out by adding the diazotised amine of the formula (IV) to the triazine compound of the formula (V) in water at a temperature of from 0 to 10° C.

24. The process according to claim 23, which includes the preliminary step of preparing the triazine compound of the formula (V), by reacting an aminonaphthalenesulphonic acid compound of the formula (VI)

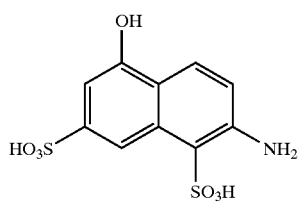
(VI)

with a cyanuric halide of the formula (VII)

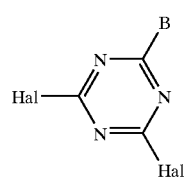
(VII)

wherein each Hal is a halogen atom and B is fluorine; chlorine; the group $OR^3$ (in which $R^3$ is hydrogen, $C_{1-4}$ alkyl or phenyl); the group $NR^4R^5$ (in which each of $R^4$ and $R^5$ independently is hydrogen, $C_{1-4}$ alkyl or phenyl; or each $R^4$, $R^5$ and N together form an optionally substituted aromatic heterocyclic ring); the group $^+N R^6 R^7 R^9$ (in which each of $R^6$, $R^7$ and $R^8$ independently is $C_{1-4}$ alkyl or phenyl or each of $R^6$, $R^7$, $R^8$ and N together form an optionally substituted heterocyclic ring); or the group SR$^9$ (in which R$^9$ is hydrogen, C$_{1-4}$ alkyl or phenyl), to form the triazine compound of the formula (V).

25. The process according to claim 24, which is carried out by adding the aminonaphthalene sulphonic acid compound of the formula (VI) dropwise to a slurry of the cyanuric halide of the formula (VII) in an ice/water/acetone mixture.

26. The process according to claim 25, wherein, in the azo dye of the formula (Ill), a is 1 or 2, b is zero and C is the residue of a heteraromatic coupling component and the process includes the preliminary step of preparing the azo dye of the formula (III) by acylating a diamine of the formula (VIII)

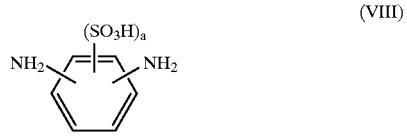

(VIII)

wherein a is zero, 1 or 2, to form an amine of the formula (IX)

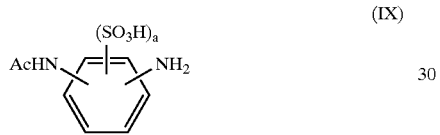

(IX)

where a is zero, 1 or 2 and Ac is an acyl group, diazotizing the amine of the formula (IX), coupling the diazotized amine to a coupling agent of the formula C-H where C is an optionally substituted aromatic or heteroaromatic residue, and deacetylating the resultant product to form the azo dye of the formula (III).

27. The process according to claim 25, wherein, in the azo dye of the formula (III) a is zero or 1, b is 1 or 2 and D, or each D independently is ureido, (C$_{1-4}$ alkyl) carbonylamino, C$_{1-4}$ alkyl or C$_{1-4}$ alkylthio and the group C is a group (iv)

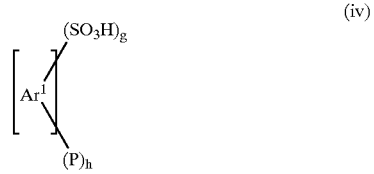

(iv)

wherein

Ar$^1$ is an aromatic diazo component;

g is zero, 1, 2, 3 or 4;

h is zero, 1, 2, or 3; and

P, or each P independently, is C$_{1-4}$ alkyl, nitro, —SO$_2$NR$^8$ (in which R$^8$ is hydrogen, C$_{1-4}$ alkyl or phenyl), carboxyl, cyano, SO$_2$Y$^1$ (in which Y$^1$ is vinyl, allyl or CH$_2$CH$_2$V, where V is a leaving group) or —NHAr$^2$, wherein Ar$^2$ is an aromatic residue substituted by at least one group T, the group T, or each group T independently, being selected from the group consisting of cyano, carboxyl, sulphonic acid and SO$_2$Y$^2$ wherein Y$^2$ is vinyl, allyl or CH$_2$CH$_2$W wherein W is a leaving group;

and the process includes the preliminary step of preparing the azo dye of the formula (III) by diazotizing an amine of the formula (X)

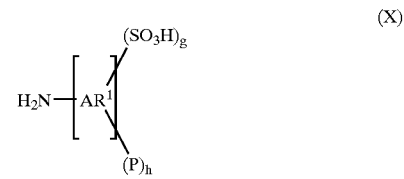

(X)

wherein each of Ar$^1$, P, g and h is as defined above and coupling the diazotized amine with a coupling agent of the formula (XI)

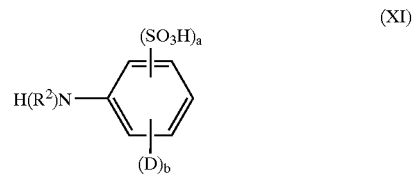

(XI)

where D is methyl, methoxy, amino, acylamino or ureido, and a is zero or 1 and b is 1 or 2.

28. A process for coloring fibre material containing a group reactive with a reactive dye or a fibre blend containing the fibre material, which method comprises applying thereto the reactive dye as claimed in claim 1.

* * * * *